United States Patent
Teramoto et al.

(10) Patent No.: US 12,494,728 B2
(45) Date of Patent: Dec. 9, 2025

(54) CONTROL DEVICE FOR ROTATING MACHINE

(71) Applicant: Mitsubishi Electric Corporation, Tokyo (JP)

(72) Inventors: Kota Teramoto, Tokyo (JP); Tetsuya Kojima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 122 days.

(21) Appl. No.: 18/577,730

(22) PCT Filed: Aug. 24, 2021

(86) PCT No.: PCT/JP2021/030936
§ 371 (c)(1),
(2) Date: Jan. 9, 2024

(87) PCT Pub. No.: WO2023/026352
PCT Pub. Date: Mar. 2, 2023

(65) Prior Publication Data
US 2024/0322722 A1 Sep. 26, 2024

(51) Int. Cl.
*H02P 27/08* (2006.01)
*H02P 6/18* (2016.01)
(Continued)

(52) U.S. Cl.
CPC .............. *H02P 21/18* (2016.02); *H02P 6/183* (2013.01); *H02P 21/06* (2013.01); *H02P 21/141* (2013.01); *H02P 21/22* (2016.02); *H02P 2207/05* (2013.01)

(58) Field of Classification Search
CPC .......... H02P 21/06; H02P 6/183; H02P 21/22; H02P 21/18; H02P 21/141; H02P 2207/05
(Continued)

(56) References Cited

U.S. PATENT DOCUMENTS 10,819,264 B1 * 10/2020 Bojoi ................... H02P 21/18
11,239,772 B1 * 2/2022 Bojoi ................... H02P 21/22
(Continued)

FOREIGN PATENT DOCUMENTS

JP 2006230174 A 8/2006

OTHER PUBLICATIONS

International Search Report (PCT/ISA/210) with translation and Written Opinion (PCT/ISA/237) mailed on Nov. 22, 2021, by the Japan Patent Office as the International Searching Authority for International Application No. PCT/JP2021/030936. (9 pages).

*Primary Examiner* — Gabriel Agared
(74) *Attorney, Agent, or Firm* — Buchanan Ingersoll & Rooney PC

(57) ABSTRACT

A control device includes a current detector that detects a stator current flowing between a voltage application unit and a stator winding of a rotating machine; a control unit that computes a voltage command value that is a command value for a stator voltage to be applied to the stator winding on the basis of the stator current and a rotor position serving as position information of a rotor of the rotating machine; a PWM modulator that performs on-off control of switching elements of the voltage application unit so that a smoothed value of the stator voltage matches the voltage command value; and a position estimator that estimates, on the basis of the voltage command value and the stator current, the rotor position through a filter that removes a frequency component of a fundamental frequency of rotational speed of the rotating machine.

12 Claims, 14 Drawing Sheets

(51) Int. Cl.
 *H02P 21/06* (2016.01)
 *H02P 21/14* (2016.01)
 *H02P 21/18* (2016.01)
 *H02P 21/22* (2016.01)

(58) Field of Classification Search
 USPC .................................................. 318/400.02
 See application file for complete search history.

(56) References Cited

U.S. PATENT DOCUMENTS

| | | | | |
|---|---|---|---|---|
| 2005/0151504 | A1* | 7/2005 | Kimura | H02P 9/007 |
| | | | | 318/807 |
| 2006/0097702 | A1* | 5/2006 | Nagashima | H02P 21/22 |
| | | | | 322/20 |
| 2007/0145919 | A1* | 6/2007 | Hamaoka | H02P 6/16 |
| | | | | 318/400.34 |
| 2011/0084638 | A1* | 4/2011 | Patel | H02P 6/18 |
| | | | | 318/473 |

* cited by examiner

CURRENT DETECTION TIMED
TO PEAKS AND VALLEY OF
CARRIER SIGNAL

CONTROL DEVICE FOR ROTATING MACHINE

FIELD

The present disclosure relates to a control device for a rotating machine that obtains rotor position information for control without using a position sensor that detects a rotor position.

BACKGROUND

In order for driving a rotating machine with full use of capabilities, position information of a rotor is needed. Therefore, position information detected by a position sensor attached to the rotating machine has been used in the driving of the rotating machine. On the other hand, position sensor-less driving techniques have been developed for rotating machines in recent years from the perspectives of reducing manufacturing costs of rotating machines further, downsizing rotating machines, and improving reliability of rotating machines.

One position sensor-less control method for rotating machines is to apply high-frequency signals to a rotating machine. In this method, stator currents are first detected when high-frequency voltages are applied to the rotating machine, and then high-frequency currents that are components having the same frequencies as the high-frequency voltages are extracted. Furthermore, the rotor position is estimated utilizing inductance of the rotating machine, that is to say, the fact that amplitude of the high-frequency current changes at a frequency twice an electrical angular frequency of the rotor position. Such a method of using the high-frequency signals has an advantage of satisfactorily estimating the rotor position even when the rotating machine is in a zero-speed or low-speed range; on the other hand, the method has a disadvantage of causing torque pulsation and noise due to the superimposed high-frequency voltages.

Other methods are also available. For example, Patent Literature 1 given below discloses a method of estimating the rotor position from stator voltages and stator currents of a rotating machine without applying high-frequency signals. According to Patent Literature 1, first, the stator voltages and the stator currents are input into an observer. Then, the observer estimates a component that, among flux linkage components, rotates synchronously with the rotor position and computes the rotor position from a phase of the estimate to output the rotor position.

CITATION LIST

Patent Literature

Patent Literature 1: Japanese Patent Application Laid-open No. 2006-230174

SUMMARY OF INVENTION

Problem to be Solved by the Invention

In a conventional technique represented by the one in Patent Literature 1, the stator voltages used for the estimation of the rotor position are not actual voltages, but stator voltage command values that are command values for the stator voltages. There is inevitably an error between the stator voltage and the stator voltage command value. Furthermore, a detection error occurs in detecting the rotor current as well.

Therefore, with the conventional method, these voltage and current errors cause an error in an estimate of the rotor position and in some cases, pulsating components as well. If the rotor position estimate having such an estimation error is used in the control of the rotating machine, torque or power pulsates and may adversely affect a connected mechanical or power system.

The present disclosure has been made in view of the above, and an object of the present disclosure is to obtain a control device for a rotating machine that is capable of reducing torque and power pulsations that result from an estimation error that an estimate of rotor position can include.

Means to Solve the Problem

In order to solve the above-stated problem and achieve the object, a control device for a rotating machine according to the present disclosure includes a voltage application unit, a current detector, a control unit, a pulse-width modulator, and a position estimator. The voltage application unit is connected between a direct-current power supply and a rotating machine and applies a rectangular stator voltage to the rotating machine through on-off switching of a plurality of switching elements included for phases. The current detector detects a stator current flowing between the voltage application unit and a stator winding of the rotating machine. On the basis of the stator current and a rotor position serving as position information of a rotor of the rotating machine, the control unit computes a voltage command value that is a command value for the stator voltage to be applied to the stator winding. The pulse-width modulator performs on-off control of the switching elements so that a smoothed value of the stator voltage matches the voltage command value. The position estimator estimates, on the basis of the voltage command value and the stator current, the rotor position through a filter that removes a frequency component of a fundamental frequency of rotational speed of the rotating machine.

Effects of the Invention

The control device for a rotating machine according to the present disclosure has an effect of reducing torque and power pulsations that result from an estimation error that an estimate of the rotor position can include.

DESCRIPTION OF EMBODIMENTS

With reference to the accompanying drawings, a detailed description is hereinafter provided of control devices for rotating machines according to embodiments of the present disclosure.

First Embodiment

Figure 1:
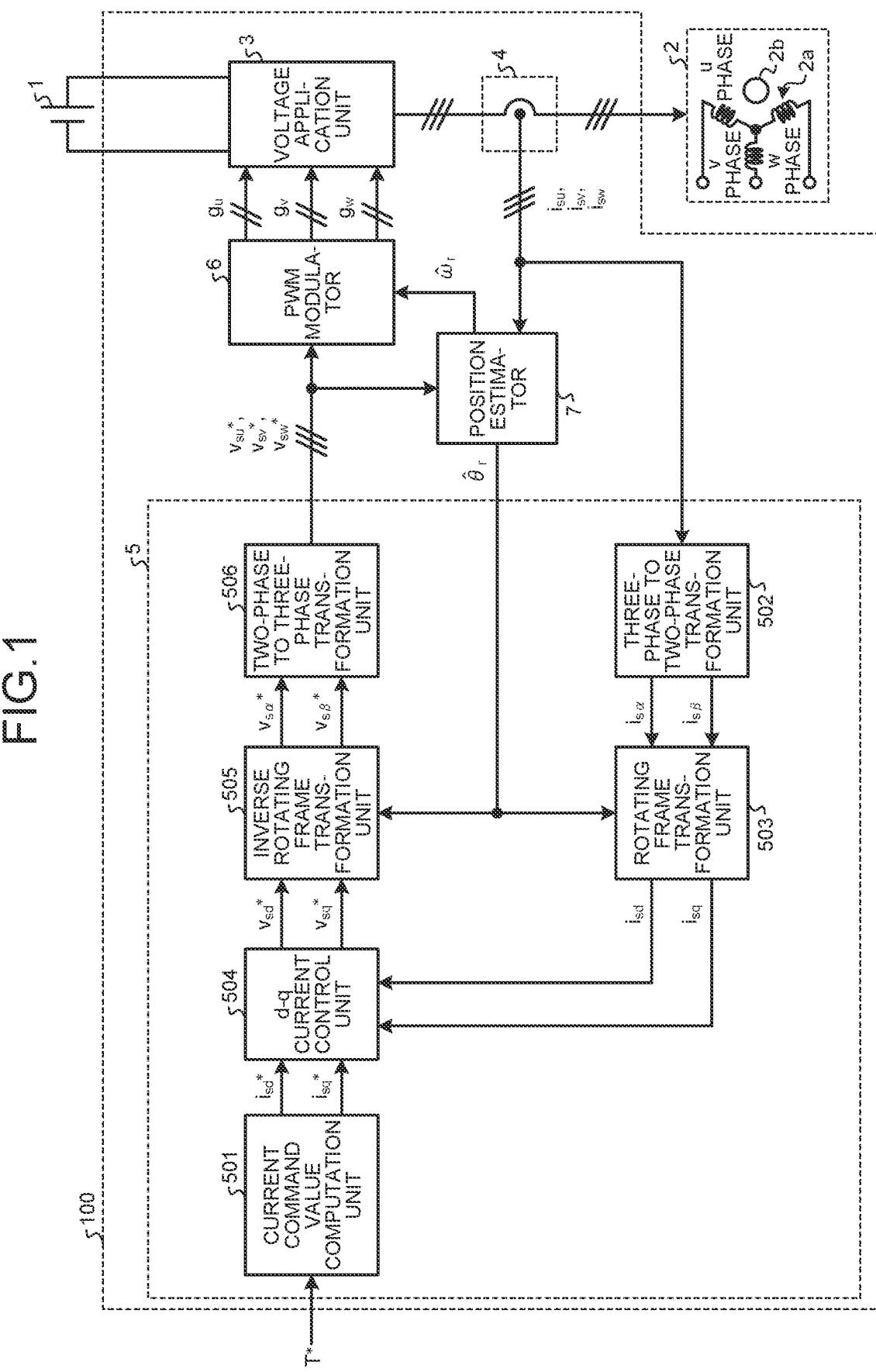
FIG. 1 is a diagram illustrating a configuration example of a control device for a rotating machine according to a first embodiment.

FIG. 1 is a diagram illustrating a configuration example of a control device 100 for a rotating machine (hereinafter abbreviated as "control device" as appropriate) according to a first embodiment. The control device 100 according to the first embodiment includes a voltage application unit 3, a current detector 4, a control unit 5, a PWM modulator 6, and a position estimator 7.

The voltage application unit 3 is connected between a direct-current power supply 1 and a rotating machine 2. The direct-current power supply 1 is a power supply source that provides the rotating machine 2 with driving power.

The rotating machine 2 is a three-phase motor in which inductance varies with a rotor position. The rotating machine 2 includes a stator 2a with u-phase, v-phase, and w-phase stator windings and a rotor 2b disposed inside the stator 2a. Depending on an operating mode, the rotating machine 2 also operates as a three-phase generator. The rotating machine 2 is assumed herein to be, for example, a synchronous reluctance motor but may be a motor other than the synchronous reluctance motor. A rotor direction in which the inductance is maximized is defined herein as a d-axis, and a direction in which the inductance is minimized is defined herein as a q-axis. For the rotor position, the d-axis is used as a reference.

The current detector 4 is disposed between the direct-current power supply 1 and the rotating machine 2. The current detector 4 detects stator currents $i_{su}$, $i_{sv}$, and $i_{sw}$ that flow between the voltage application unit 3 and the stator windings of the rotating machine 2.

The voltage application unit 3 applies rectangular stator voltages to the rotating machine 2 through on-off switching of a plurality of switching elements included for each of phases. The stator voltages are voltages that are applied to the stator windings of the rotating machine 2. The voltage application unit 3 is assumed herein to be a three-phase inverter.

The control unit 5 computes voltage command values $v_{su}^*$, $v_{sv}^*$, and $v_{sw}^*$ on the basis of the stator currents $i_{su}$, $i_{sv}$, and $i_{sw}$ detected by the current detector 4 and the rotor position that serves as position information of the rotor 2b. The voltage command values $v_{su}^*$, $v_{sv}^*$, and $v_{sw}^*$ are command values for the stator voltages for driving the rotating machine 2. The stator voltages that the voltage application unit 3 outputs are controlled by the voltage command values $v_{su}^*$, $v_{sv}^*$, and $v_{sw}^*$.

In order for smoothed values of the rectangular stator voltages output by the voltage application unit 3 to respectively match the voltage command values $v_{su}^*$, $v_{sv}^*$, and $v_{sw}^*$, the PWM modulator 6 generates gate signals $g_u$, $g_v$, and $g_w$ that effect on-off control of the switching elements.

The position estimator 7 computes a rotor position estimate $\hat{\theta}_r$, on the basis of the voltage command values $v_{su}^*$, $v_{sv}^*$, and $v_{sw}^*$ and the stator currents $i_{su}$, $i_{sv}$, and $i_{sw}$. The rotor position estimate $\hat{\theta}_r$, is an estimate of the rotor position, which serves as the position information of the rotor 2b. The rotor position estimate $\hat{\theta}_r$, herein is a value converted into an electrical angle.

Figure 2:
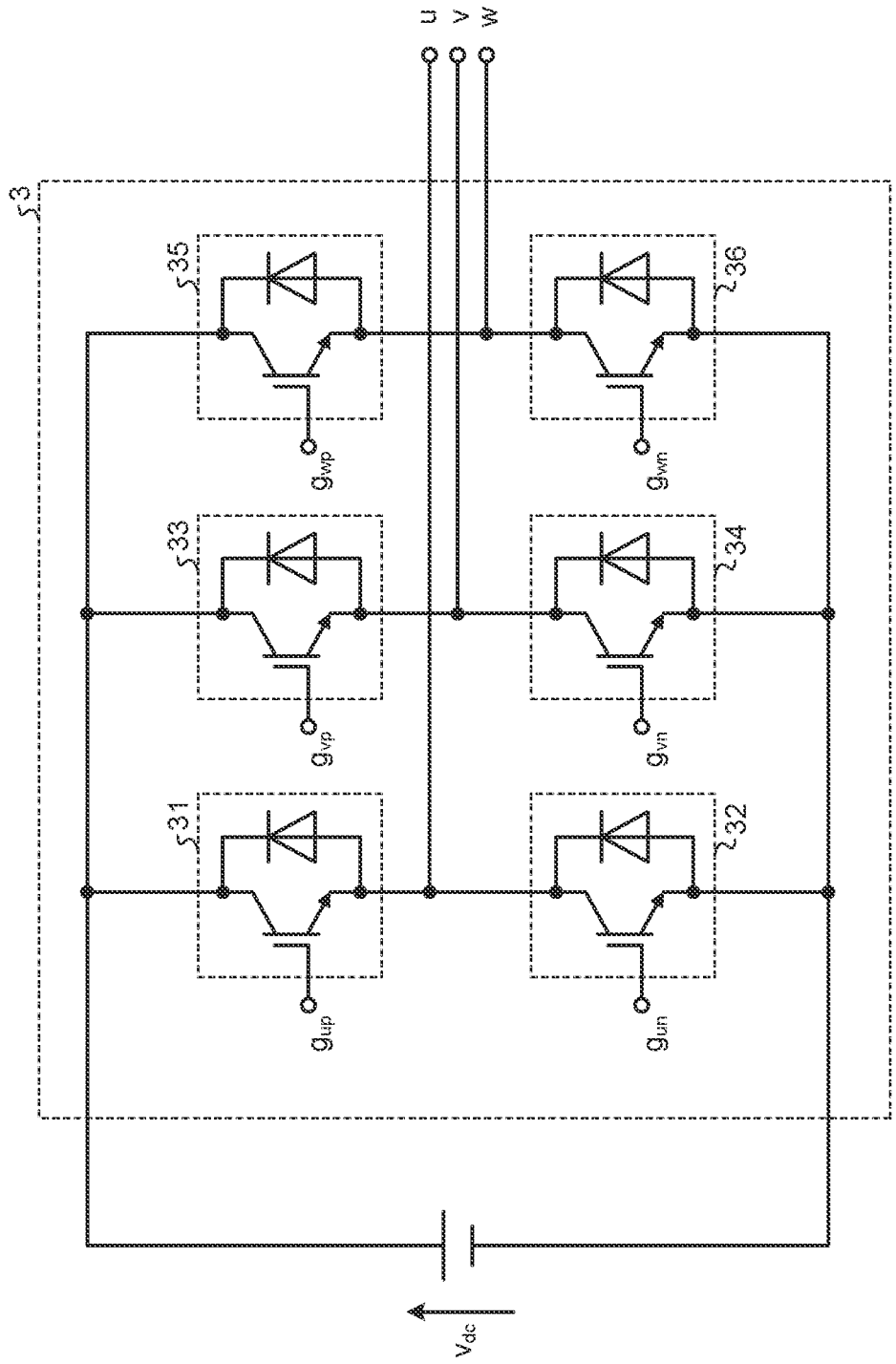
FIG. 2 is a diagram illustrating a configuration example of a main circuit of a three-phase inverter used as a voltage application unit in FIG. 1.

FIG. 2 is a diagram illustrating a configuration example of a main circuit of the three-phase inverter used as the voltage application unit 3 of FIG. 1. In FIG. 2, the switching element 31 is a u-phase positive-side switching element, and the switching element 32 is a u-phase negative-side switching element. Similarly, the switching element 33 is a v-phase positive-side switching element and the switching element 34 is a v-phase negative-side switching element, and the switching element 35 is a w-phase positive-side switching element and the switching element 36 is a w-phase negative-side switching element. The switching elements 31 to 36 to be used are, for example, insulated-gate bipolar transistors (IGBTs) illustrated but may be switching elements other than the IGBTs. The switching elements other than the IGBTs are, for example, metal-oxide-semiconductor field-effect transistors (MOSFETs). A diode is connected across and in antiparallel with one of the switching elements, correspondingly. The term "antiparallel" refers to a connection configuration in which an anode of the diode is connected to an emitter of the IGBT, with a cathode of the diode connected to a collector of the IGBT.

A specific description is provided next of how the control unit 5 operates. The control unit 5 includes a current command value computation unit 501, a three-phase to two-phase transformation unit 502, a rotating frame transformation unit 503, a d-q current control unit 504, an inverse rotating frame transformation unit 505, and a two-phase to three-phase transformation unit 506. A torque command value $T^*$ is input to the control unit 5. The control unit 5 computes the voltage command values $v_{su}^*$, $v_{sv}^*$, and $v_{sw}^*$ in order for the rotating machine 2 to output torque corresponding to the torque command value $T^*$.

The current command value computation unit 501 computes current command values $i_{sd}^*$ and $i_{sq}^*$ that are command values for stator currents needed for the rotating machine 2 to output the torque corresponding to the torque command value $T^*$. The current command values $i_{sd}^*$ and $i_{sq}^*$ are computed values in a rotating frame that rotates synchronously with rotational speed of the rotating machine 2. The current command values $i_{sd}^*$ and $i_{sq}^*$ are computed so that a root-mean-square current value is minimized for the torque, that is to say, copper loss of the rotating machine 2 is minimized for the torque.

The three-phase to two-phase transformation unit 502 transforms the stator currents $i_{su}$, $i_{sv}$, and $i_{sw}$ in a three-phase frame to stator currents $i_{s\alpha}$ and $i_{s\beta}$ in a two-phase frame that is a stationary frame by three-phase to two-phase transformation. A transformation matrix $C_{32}$ shown in Formula (1) below is used herein for this transformation operation.

Formula 1

$$\begin{bmatrix} i_{s\alpha} \\ i_{s\beta} \end{bmatrix} = \sqrt{\frac{2}{3}} \underbrace{\begin{bmatrix} 1 & -\frac{1}{2} & -\frac{1}{2} \\ 0 & \frac{\sqrt{3}}{2} & -\frac{\sqrt{3}}{2} \end{bmatrix}}_{C_{32}} \begin{bmatrix} i_{su} \\ i_{sv} \\ i_{sw} \end{bmatrix} \quad (1)$$

Using the rotor position estimate $\hat{\theta}_r$, the rotating frame transformation unit 503 transforms the stator currents $i_{s\alpha}$ and $i_{s\beta}$ in the two-phase frame to stator currents $i_{sd}$ and $i_{sq}$ in the rotating frame by rotating frame transformation. A transformation matrix $C_{dq}(\theta_r)$ shown in Formula (2) below is used herein for this transformation operation.

Formula 2

$$\begin{bmatrix} i_{sd} \\ i_{sq} \end{bmatrix} = \underbrace{\begin{bmatrix} \cos\theta_r & \sin\theta_r \\ -\sin\theta_r & \cos\theta_r \end{bmatrix}}_{C_{dq}(\theta_r)} \begin{bmatrix} i_{s\alpha} \\ i_{s\beta} \end{bmatrix} \quad (2)$$

The d-q current control unit 504 performs control so that the stator currents $i_{sd}$ and $i_{sq}$ match the current command values $i_{sd}^*$ and $i_{sq}^*$, respectively, and computes voltage command values $v_{s\alpha}^*$ and $v_{s\beta}^*$ in the rotating frame. Proportional-integral control can be used for this control. Control other than the proportional-integral control may be used instead.

Using the rotor position estimate $\hat{\theta}_r$, the inverse rotating frame transformation unit 505 transforms the voltage command values $v_{sd}^*$ and $v_{sq}^*$ in the rotating frame to voltage command values $v_{s\alpha}^*$ and $v_{s\beta}^*$ in the two-phase frame by inverse rotating frame transformation. An inverse transformation matrix $C_{dq}^{-1}(\hat{\theta}_r)$ shown in Formula (3) below is used herein for this inverse transformation operation.

Formula 3

$$\begin{bmatrix} v_{s\alpha}^* \\ v_{s\beta}^* \end{bmatrix} = \underbrace{\begin{bmatrix} \cos\hat{\theta}_r & -\sin\hat{\theta}_r \\ \sin\hat{\theta}_r & \cos\hat{\theta}_r \end{bmatrix}}_{C_{dq}^{-1}(\hat{\theta}_r)} \begin{bmatrix} v_{sd}^* \\ v_{sq}^* \end{bmatrix} \quad (3)$$

The two-phase to three-phase transformation unit 506 transforms the voltage command values $v_{s\alpha}^*$ and $v_{s\beta}^*$ in the two-phase frame to the voltage command values $v_{su}^*$, $v_{sv}^*$, and $v_{sw}^*$ in the three-phase frame by two-phase to three-phase transformation. A transformation matrix $C_{23}$ shown in Formula (4) below is used herein for this transformation operation.

Formula 4

$$\begin{bmatrix} v_{su}^* \\ v_{sv}^* \\ v_{sw}^* \end{bmatrix} = \sqrt{\frac{2}{3}} \underbrace{\begin{bmatrix} 1 & 0 \\ -\frac{1}{2} & \frac{\sqrt{3}}{2} \\ -\frac{1}{2} & -\frac{\sqrt{3}}{2} \end{bmatrix}}_{C_{23}} \begin{bmatrix} v_{s\alpha}^* \\ v_{s\beta}^* \end{bmatrix} \quad (4)$$

Figure 3:
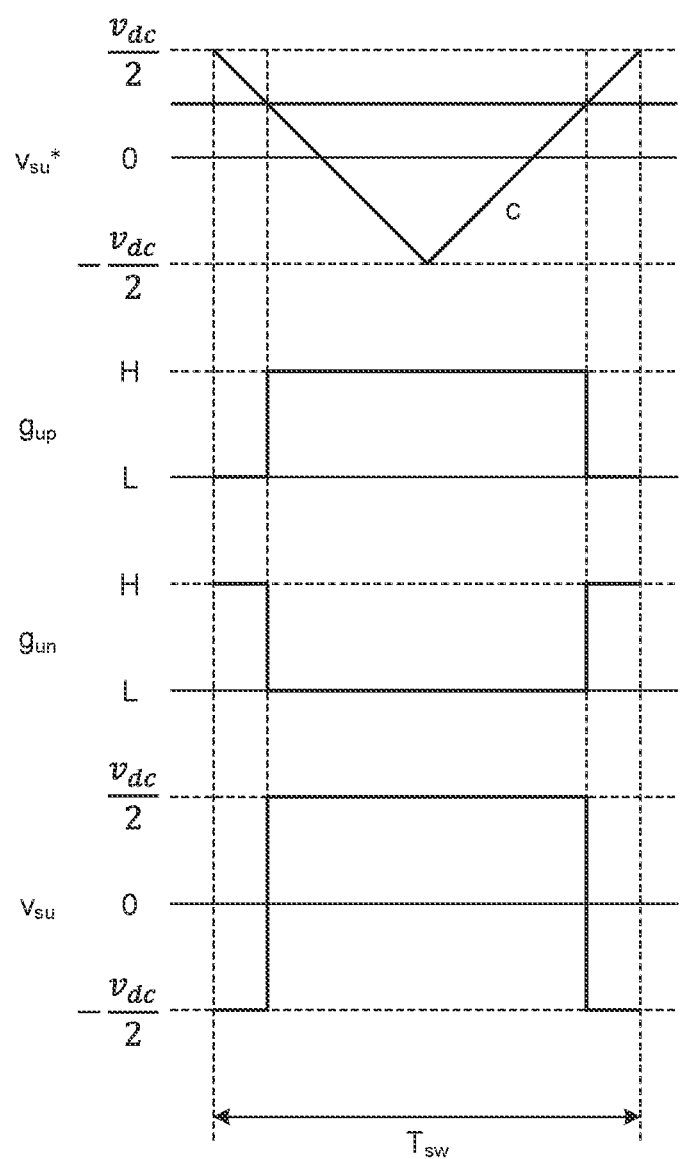
FIG. 3 is a diagram provided for describing how a pulse-width modulation (PWM) modulator illustrated in FIG. 1 operates.

FIG. 3 is a diagram provided for describing how the PWM modulator 6 illustrated in FIG. 1 operates. FIG. 3 illustrates waveforms for the u phase as exemplary waveforms for one of the phases.

In FIG. 3, a top section illustrates the waveform of the u-phase voltage command value $v_{su}^*$, which is a voltage command value for the u-phase, and a triangular waveform of a carrier signal "c". An upper-middle section illustrates the waveform of the u-phase upper-side gate signal $g_{up}$, which is a gate signal for the u-phase upper side. A lower-middle section illustrates the waveform of the u-phase lower-side gate signal $g_{un}$, which is a gate signal for the u-phase lower side. A bottom section illustrates the waveform of a u-phase voltage $v_{su}$, which is the stator voltage of the u phase. $v_{dc}$ represents a power supply voltage, which is the voltage of the direct-current power supply 1. As illustrated in FIG. 3, half $v_{dc}/2$ of the power supply voltage $v_{dc}$ is a step width of the phase voltage in this case, and the u-phase voltage command value $v_{su}^*$ and the u-phase voltage $v_{su}$ vary within a $\pm v_{dc}/2$ range.

The PWM modulator 6 compares the u-phase upper-side voltage command value $v_{su}^*$ with the carrier signal c. When the u-phase upper-side voltage command value $v_{su}^*$ is greater than a value of the carrier signal c, the PWM modulator 6 sets the u-phase upper-side gate signal $g_{up}$ to "H" and the u-phase lower-side gate signal $g_{un}$ to "L". When the u-phase upper-side voltage command value $v_{su}^*$ is less than or equal to a value of the carrier signal "c", the PWM modulator 6 sets the u-phase upper-side gate signal $g_{up}$ to "L" and the u-phase lower-side gate signal $g_{un}$ to "H". Here "H" denotes "High", and "L" denotes "Low". When the u-phase upper-side gate signal $g_{up}$=H and the u-phase lower-side gate signal $g_{un}$=L, the u-phase positive-side switching element 31 of the voltage application unit 3 is turned on, and the u-phase negative-side switching element 32 is turned off. When the u-phase upper-side gate signal $g_{up}$=L and the u-phase lower-side gate signal $g_{un}$=H, the u-phase positive-side switching element 31 of the voltage application unit 3 is turned off, and the u-phase negative-side switching element 32 is turned on. Operations for the v-phase and the w-phase are identical with the operation for the u-phase.

The u-phase upper-side voltage command value $v_{su}^*$ averages out in a switching period $T_{sw}$ to the u-phase voltage $v_{su}$, which is the actual output. The switching period $T_{sw}$ is equal to a carrier period, which is a period of the carrier signal c. Generally, when the positive-side and negative-side switching elements are to be turned on and off, a dead time, although not illustrated in FIG. 3, is provided as a time during which both the switching elements are off for the purpose of preventing both the switching elements from being on at the same time. For simplified description, a neutral point voltage that is an average of the three phase voltages is ignored in the waveform of the u-phase voltage $v_{su}$ illustrated in FIG. 3.

Adopted in the first embodiment is a technique of synchronizing a switching frequency with an integer multiple of a fundamental frequency $f_s$ of the rotational speed of the rotating machine 2. The switching frequency is a reciprocal of the switching period $T_{sw}$. This synchronization technique reduces lower-order harmonic components even when the switching frequency is not sufficiently high compared with the fundamental frequency $f_s$. As a result, the rotating machine 2 can be supplied with the stator voltage and the stator current that both have low distortion. The phrase "when the switching frequency is not sufficiently high" mentioned here applies to, for example, cases where the switching frequency is 1 to 27 times as high as the fundamental frequency $f_s$.

Next, a description is provided of a principle of estimation of the rotor position and the rotational speed by the position estimator 7. To begin with, a rotating machine model having characteristics of the rotating machine 2 expressed mathematically is expressed in the two-phase frame by Formulas (5) and (6) below.

Formula 5

$$v_s^{\alpha\beta} = R_s i_s^{\alpha\beta} + \frac{d}{dt}\psi_s^{\alpha\beta} \qquad (5)$$

Formula 6

$$\psi_s^{\alpha\beta} = \begin{bmatrix} L_{savg} + L_{svar}\cos(2\theta_r) & L_{svar}\sin(2\theta_r) \\ L_{svar}\sin(2\theta_r) & L_{savg} - L_{svar}\cos(2\theta_r) \end{bmatrix} i_s^{\alpha\beta} \qquad (6)$$

Here $v_s^{\alpha\beta}$ represents stator voltage, $i_s^{\alpha\beta}$ represents stator current, $\psi_s^{\alpha\beta}$ represents flux linkage, and $R_s$ represents winding resistance. The superscript "$\alpha\beta$" indicates that the value is in the two-phase frame.

The inductance of the rotating machine 2 varies with the rotor position. Above Formula (6) is an expression using a mean inductance component $L_{savg}$ for which the inductance does not vary depending on the rotor position and a variable inductance component $L_{svar}$ for which the inductance varies at a frequency twice an electrical angular frequency of the rotor position. The mean inductance component $L_{savg}$ and the variable inductance component $L_{svar}$ are expressed respectively by Formulas (7) and (8) below that use d-axis inductance $L_{sd}$ and q-axis inductance $L_{sq}$.

Formula 7

$$L_{savg} = \frac{L_{sd} + L_{sq}}{2} \qquad (7)$$

Formula 8

$$L_{svar} = \frac{L_{sd} - L_{sq}}{2} \qquad (8)$$

As shown in Formula (9) below, an active flux $\psi_{afd}^{\alpha\beta}$ with the d-axis as a reference can be extracted from the rotating machine model expressed by above Formulas (5) and (6) by subtracting a product of the q-axis inductance $L_{sq}$ and the stator current $i_s^{\alpha\beta}$ from the flux linkage $\psi_s^{\alpha\beta}$.

Formula 9

$$\psi_{afd}^{\alpha\beta} = \psi_s^{\alpha\beta} - L_{sq} i_s^{\alpha\beta} \qquad (9)$$

The active flux $\psi_{afd}^{\alpha\beta}$ with the d-axis as the reference is a component of the flux linkage $\psi_s^{\alpha\beta}$ that rotates synchronously with the rotor position.

The stator current $i_s^{\alpha\beta}$ can be expressed by Formula (10) below that uses its root-mean-square current value $I_{ph}$ and a current flow angle $\varphi_1$ that is an angular difference between the stator current $i_s^{\alpha\beta}$ and the rotor position.

Formula 10

$$i_s^{\alpha\beta} = \sqrt{3} I_{ph} \begin{bmatrix} \cos(\theta_r + \phi_i) \\ \sin(\theta_r + \phi_i) \end{bmatrix} \qquad (10)$$

Substituting above Formulas (6) and (10) into the right side of above Formula (9) gives Formula (11) below as an expression of the active flux $\psi_{afd}^{\alpha\beta}$ with the d-axis as the reference in the two-phase frame.

Formula 11

$$\psi_{afd}^{\alpha\beta} = \underbrace{2L_{svar}\sqrt{3} I_{ph}\cos\varphi_i}_{(L_{sd}-L_{sq})i_{sd}} \begin{bmatrix} \cos\theta_r \\ \sin\theta_r \end{bmatrix} \qquad (11)$$

As above Formula (11) shows, the active flux $\psi_{afd}^{\alpha\beta}$ is the component generated by a product of the variable inductance component $L_{svar}$ and the stator current $i_{sd}$. Since the d-axis direction is used as the reference for the active flux $\psi_{afd}^{\alpha\beta}$ of above Formula (11), the rotor position can be estimated by inputting this active flux $\psi_{afd}^{\alpha\beta}$ into a publicly known observer.

It is to be noted that an active flux $\psi_{afq}^{\alpha\beta}$ with the q-axis as a reference obtained by subtracting a product of the d-axis inductance $L_{sd}$ and the stator current $i_s^{\alpha\beta}$ from the flux linkage $\psi_s^{\alpha\beta}$, as expressed by Formula (12) below instead of above Formula (9), can be used.

Formula 12

$$\psi_{afq}^{\alpha\beta} = \psi_s^{\alpha\beta} - L_{sd} i_s^{\alpha\beta} \qquad (12)$$

As in the case of using the d-axis as the reference, substituting above Formulas (6) and (10) into the right side of above Formula (12) gives Formula (13) below as an expression of the active flux $\psi_{afq}^{\alpha\beta}$ with the q-axis as the reference in the two-phase frame.

Formula 13

$$\psi_{afq}^{\alpha\beta} = \underbrace{-2L_{mac}\sqrt{3} I_{ph}\sin\varphi_i}_{(L_{sq}-L_{sd})i_{sq}} \begin{bmatrix} -\sin\theta_r \\ \cos\theta_r \end{bmatrix} \qquad (13)$$

Since the q-axis direction is used as the reference for the active flux $\psi_{afq}^{\alpha\beta}$ expressed by above Formula (13), the rotor position can be estimated by inputting this active flux $\psi_{afq}^{\alpha\beta}$ into a publicly known observer.

In the present embodiment, the rotor position is estimated by inputting the active flux $\psi_{afd}$ with the d-axis as the reference into the above-mentioned observer disclosed in Patent Literature 1. It is to be noted that the rotor position may be estimated with an observer other than the observer disclosed in Patent Literature 1.

The observer expressed by Formula (14) in Patent Literature 1 can be expressed by Formula (14) below that uses the variable to be used herein.

Formula 14

$$s\hat{\psi}_{safd}^{dq} = G\left\{v_s^{dq} - R_s i_s^{dq} - (sI + \omega_s J)L_{sq} i_s^{dq} - \omega_r J\hat{\psi}_{safd}^{dq}\right\} + (\omega_r - \omega_s)J\hat{\psi}_{safd}^{dq} \quad (14)$$

In above Formula (14), $\hat{\psi}_{safd}^{dq}$ is an estimate of the active flux with the d-axis as the reference. This observer is expressed in the rotating frame synchronized with the estimated rotor position, and the superscript "dq" indicates that the value is in the rotating frame. In above Formula (14), $\omega_r$ represents rotational angular speed, and $\omega_s$ represents rotational angular speed in the rotating frame. Symbol J in above Formula (14) is a transformation matrix expressed by Formula (15) below.

Formula 15

$$J = \begin{bmatrix} 0 & -1 \\ 1 & 0 \end{bmatrix} \quad (15)$$

When an observer gain in the observer expressed by above Formula (14) is set according to Patent Literature 1, the estimate of the active flux $\psi_{afd}$ with the d-axis as the reference can be obtained. Since the active flux $\psi_{afd}$ with the d-axis as the reference synchronizes with the rotor position $\theta_r$ as shown in above Formula (11), the rotor position can be estimated by computing an arctangent of two components from above Formula (11).

Above Formula (14) is the expression using the observer but is fundamentally the expression that integrates terms including stator voltage $v_s^{dq}$ and stator current $i_s^{dq}$. During high-speed rotation of the rotating machine 2, the term with a product of the winding resistance $R_s$ and the stator current $i_s^{dq}$ is small compared to the stator voltage $v_s^{dq}$ and thus can be ignored here in the computation of the flux linkage $\psi_s$ that uses the integration. Voltage command value $v_s^{dq*}$ can be used as the stator voltage $v_s^{dq}$, and the detected values can be used for the stator current $i_s^{dq}$.

Figure 4:
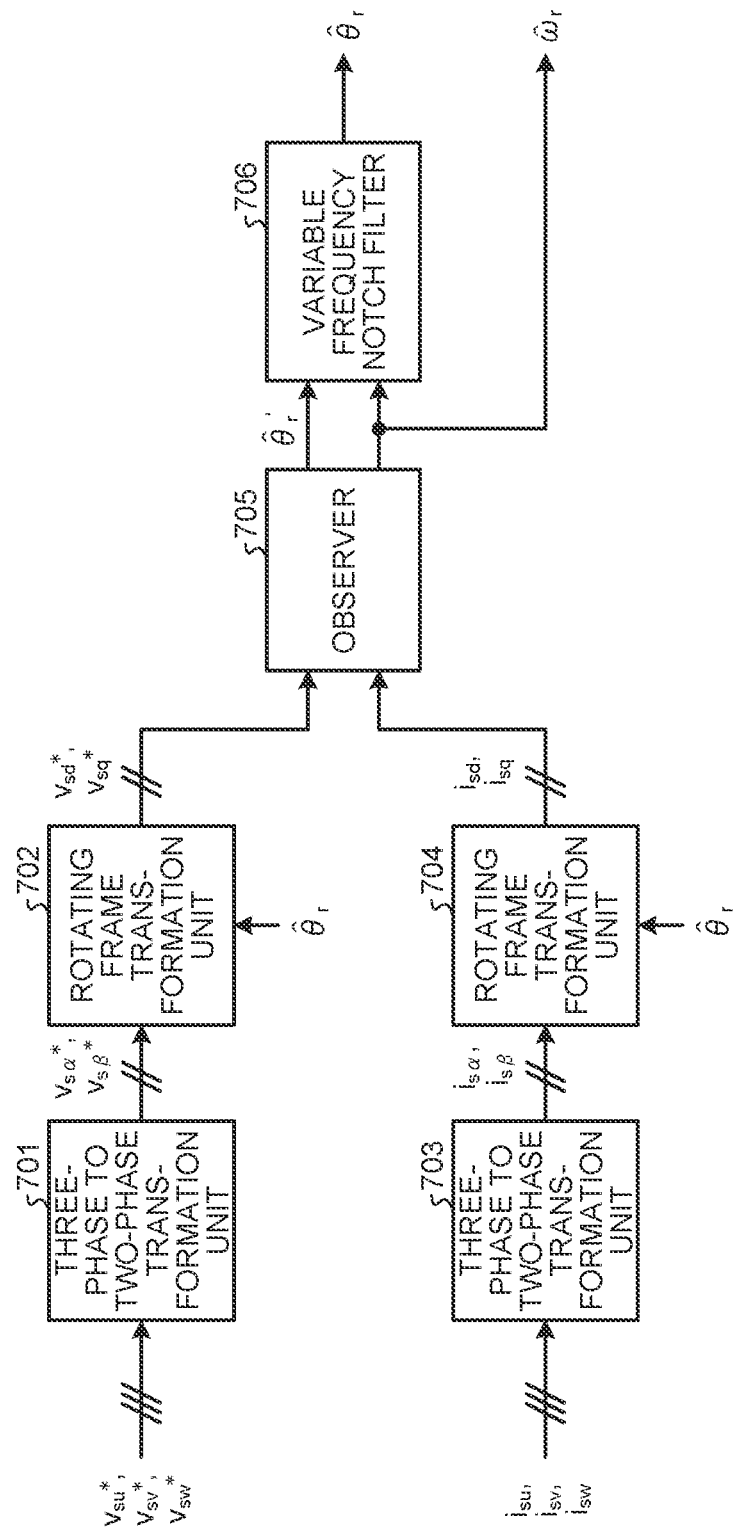
FIG. 4 is a diagram illustrating a configuration example of a position estimator illustrated in FIG. 1.

FIG. 4 is a diagram illustrating a configuration example of the position estimator 7 illustrated in FIG. 1. The position estimator 7 can be configured to include three-phase to two-phase transformation units 701 and 703, rotating frame transformation units 702 and 704, an observer 705, and a variable frequency notch filter 706.

The three-phase to two-phase transformation unit 701 transforms the voltage command values $v_{su}^*$, $v_{sv}^*$, and $v_{sw}^*$, which are the command values for the stator voltages $v_s$ of the phases in the three-phase frame, to voltage command values $v_{s\alpha}^*$ and $v_{s\beta}^*$ in the two-phase frame by three-phase to two-phase transformation. Using the rotor position estimate $\hat{\theta}_r$, the rotating frame transformation unit 702 transforms the voltage command values $v_{s\alpha}^*$ and $v_{s\beta}^*$ in the two-phase frame to voltage command values $v_{sd}^*$ and $v_{sq}^*$ in the rotating frame by rotating frame transformation. The rotor position estimate $\hat{\theta}_r$ used is an output of the variable frequency notch filter 706, that is to say, an output as feedback from the position estimator 7.

Similarly, the three-phase to two-phase transformation unit 703 transforms the stator currents $i_{su}$, $i_{sv}$, and $i_{sw}$ in the three-phase frame to stator currents $i_{s\alpha}$ and $i_{s\beta}$ in the two-phase frame by three-phase to two-phase transformation. Using the rotor position estimate $\hat{\theta}_r$, the rotating frame transformation unit 704 transforms the stator currents $i_{s\alpha}$ and $i_{s\beta}$ in the two-phase frame to stator currents $i_{sd}$ and $i_{sq}$ in the rotating frame by rotating frame transformation.

Using the observer mentioned earlier, the observer 705 computes a rotor position estimate $\hat{\theta}_r'$ and a rotational angular speed estimate $\hat{\omega}_r$ that is an estimate of the rotational angular speed. The rotor position estimate $\hat{\theta}_r'$ is a rotor position estimate that has not undergone filter processing. According to Patent Literature 1, not only the observer but also a phase lock loop is gone through for the estimation of the rotor position and the rotational angular speed. The observer 705 herein, too, includes the function of the phase lock loop. The position estimator 7 simply takes the values in the three-phase frame as the inputs but is not limited to this. As illustrated in FIG. 1, the control unit 5 includes the three-phase to two-phase transformation unit 502 and the rotating frame transformation unit 503 and may provide the values in the rotating frame as inputs.

The rotor position estimate $\hat{\theta}_r'$ computed by the observer 705 is input to the variable frequency notch filter 706. Furthermore, the rotational angular speed estimate $\hat{\omega}_r$ computed by the observer 705 is input to the variable frequency notch filter 706 as information indicating a fundamental frequency component of the rotational speed of the rotating machine 2. The variable frequency notch filter 706 computes the rotor position estimate $\hat{\theta}_r$ on the basis of the rotor position estimate $\hat{\theta}_r'$ and the rotational angular speed estimate $\hat{\omega}_r$. The rotor position estimate $\hat{\theta}_r$ is the rotor position estimate that has undergone the filter processing.

A supplemental explanation is provided here of the computational processing according to the first embodiment. To begin with, suppose that $T_{psi1}$ is a computation period for the computation of the flux linkage $\psi_s$ that uses the observer. This computation period $T_{psi1}$ is not an integer multiple of half of the switching period $T_{sw}$. Next, suppose that $T_{psi2}$ is a computation period for the computation of the rotor position estimate $\hat{\theta}_r$ that follows the computation of the flux linkage $\psi_s$. This computation period $T_{psi2}$, too, is not an integer multiple of the half of the switching period $T_{sw}$.

A description is provided next of a principle of the filter processing by the variable frequency notch filter 706 according to the first embodiment. To begin with, a transfer function of a notch filter that implements the variable frequency notch filter 706 is expressed in an analog domain by Formula (16) below.

Formula 16

$$H(s) = \frac{s^2 + \omega_0^2}{s^2 + 2\zeta_r \omega_0 s + \omega_0^2} \quad (16)$$

In above Formula (16), $\zeta_r$ represents a damping ratio. Furthermore, $\omega_0$ is a resonant angular frequency to be removed by the variable frequency notch filter 706. In the processing described herein, the fundamental angular frequency $\omega_r$ corresponding to the fundamental frequency $f_s$ is set. A relationship between the fundamental angular frequency $\omega_r$ and the fundamental frequency $f_s$ is expressed by Formula (17) below.

Formula 17

$$\omega_r = 2\pi f_s \quad (17)$$

Expressing above Formula (16) in the form of a digital filter by a bilinear transform gives Formula (18) below.

Formula 18

$$H(z) = \frac{b_{10} + b_{11}z^{-1} b_{12}z^{-2}}{1 + a_{11}z^{-1} + a_{12}z^{-2}} \tag{18}$$

Coefficients $a_{11}$, $a_{12}$, $b_{10}$, $b_{11}$, and $b_{12}$ in above Formula (18) are expressed by the Formulas (19) to (23), respectively.

Formula 19

$$a_{11} = \frac{-8 + 2(\omega_0 T_{smp})^2}{4 + 4\zeta_r \omega_0 T_{smp} + (\omega_0 T_{smp})^2} = k_1 \tag{19}$$

Formula 20

$$a_{12} = 2k_2 - 1 \tag{20}$$

Formula 21

$$b_{10} = \frac{4 + (\omega_0 T_{smp})^2}{4 + 4\zeta_r \omega_0 T_{smp} + (\omega_0 T_{smp})^2} = k_2 \tag{21}$$

Formula 22

$$b_{11} = k_1 \tag{22}$$

Formula 23

$$b_{12} = k_2 \tag{23}$$

In above Formulas (19) and (21), $T_{smp}$ is a computation period of the filter processing. Based on these Formulas, a difference equation of the digital filter is expressed by Formula (24) below.

Formula 24

$$y = k_1(x^{-1} + y^{-1}) + k_2(x + x^{-2} - 2y^{-2}) + y^{-2} \tag{24}$$

In above Formula (24), x represents an input signal for the digital filter, and y represents an output signal of the digital filter. By implementing the processing using Formula (24), the variable frequency notch filter 706 according to the first embodiment is enabled to implement its function. Above Formula (24) shows that using at least two coefficients $k_1$ and $k_2$, the variable frequency notch filter 706 can implement its function. These two coefficients $k_1$ and $k_2$, are filter coefficients and are variables in the variable frequency notch filter 706.

In the first embodiment, the two variables of above Formula (24) are precomputed and stored in a table for each resonant angular frequency $\omega_0$, that is to say, for each fundamental frequency $f_s$ of the rotating machine 2. Basically, the resonant angular frequency $\omega_0$ is set at a value corresponding to the fundamental frequency $f_s$ of the rotating machine 2, but with a lower limit. This is because, when the resonant angular frequency $\omega_0$ is set below a response frequency for the position estimation, interference between the filter processing by the variable frequency notch filter 706 and the position estimation processing by the position estimator 7 occurs, and response for the rotor position estimate $\hat{\theta}_r$ may be reduced and/or oscillation may occur. Here the lower limit for the resonant angular frequency $\omega_0$ is set equal to or higher than the response frequency for the position estimation processing, where the rotor position estimate $\hat{\theta}_r$ is computed. If the lower limit for the resonant angular frequency $\omega_0$ is set higher than or equal to the response frequency for the position estimation processing, the operation is made possible without involving the above-mentioned problem.

Figure 5:
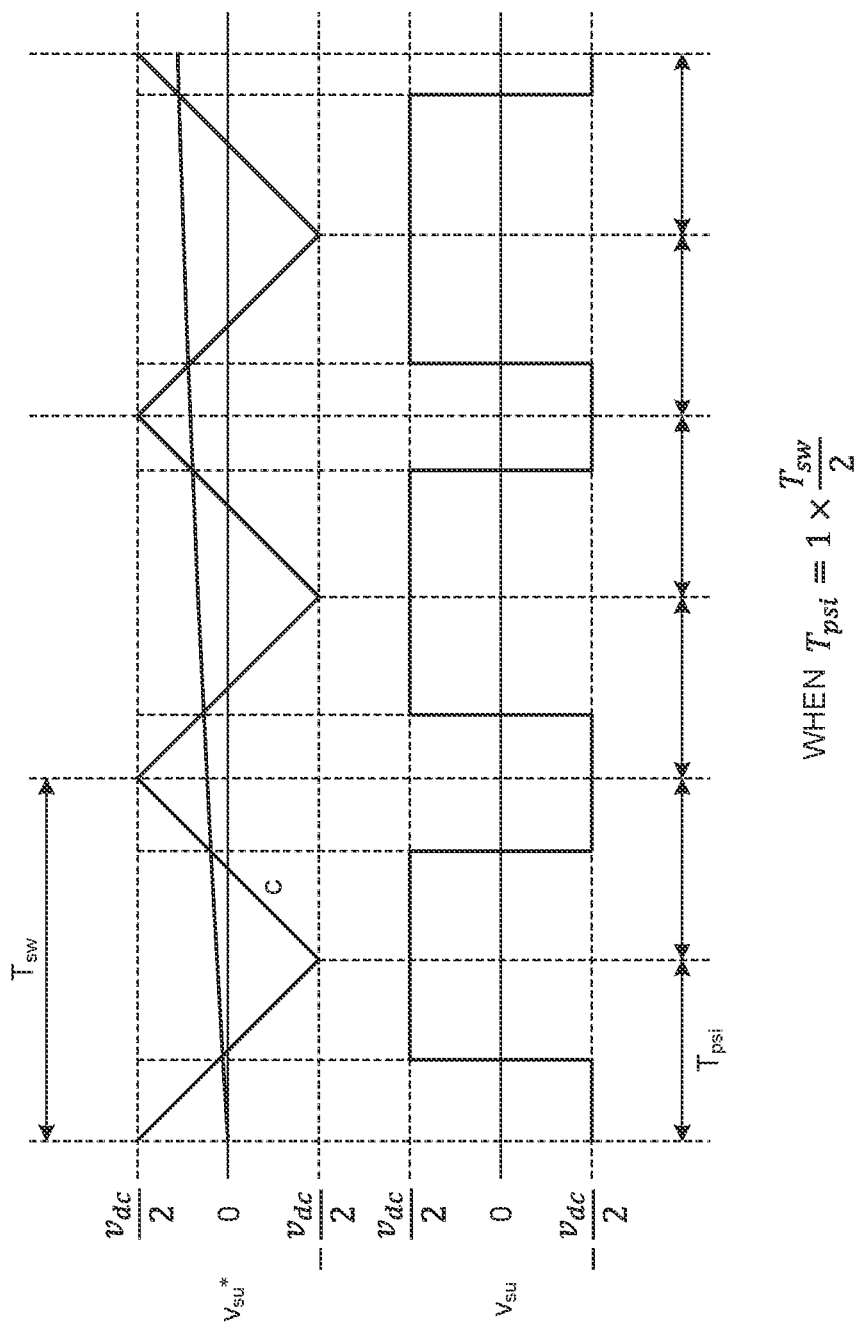
FIG. 5 is a first diagram provided for explaining a relationship between a switching period and a control computation period in the first embodiment.
Figure 6:
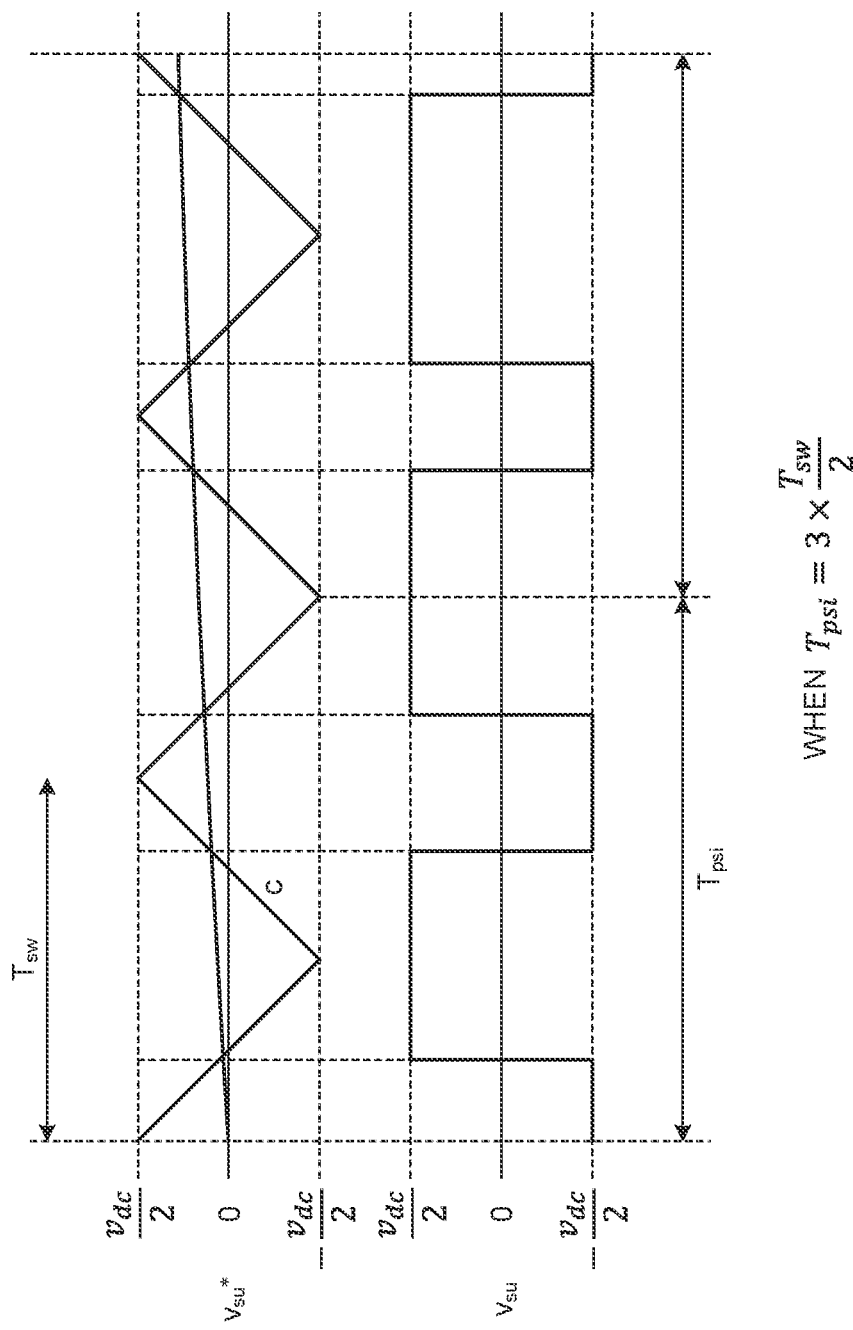
FIG. 6 is a second diagram provided for explaining the relationship between the switching period and the control computation period in the first embodiment.
Figure 7:
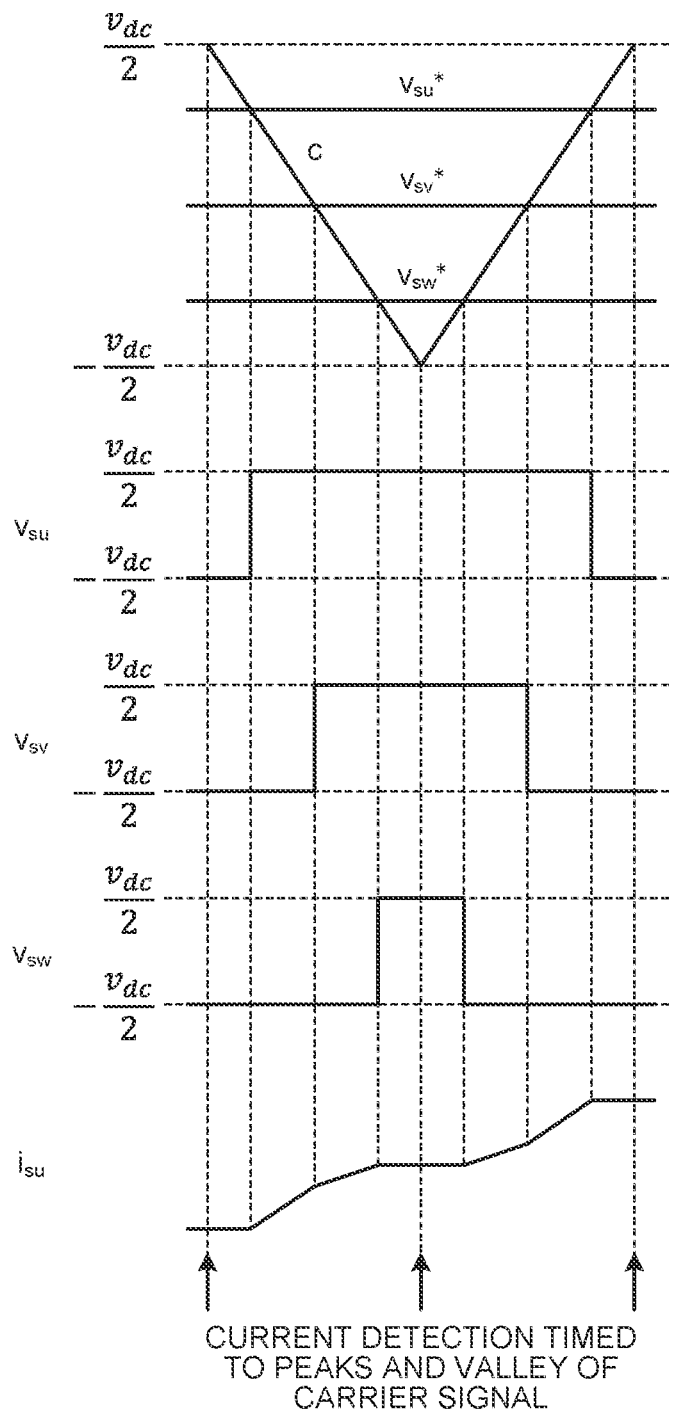
FIG. 7 is a diagram provided for explaining timing of phase current detection in the first embodiment.

With reference to FIGS. 5 to 7, a description is provided next of a relationship between the switching period $T_{sw}$ and a control computation period $T_{psi}$. FIG. 5 is a first diagram provided for explaining the relationship between the switching period $T_{sw}$ and the control computation period $T_{psi}$ in the first embodiment. FIG. 6 is a second diagram provided for explaining the relationship between the switching period $T_{sw}$ and the control computation period $T_{psi}$ in the first embodiment. FIG. 7 is a diagram provided for explaining timing of phase current detection in the first embodiment. Here the computation period $T_{psi1}$ for the flux linkage $\psi_s$ and the computation period $T_{psi2}$ for the rotor position estimate $\hat{\theta}_r$ are equal, and the control computation period $T_{psi}$, too, is equal to each of the computation period $T_{psi1}$ for the flux linkage $\psi_s$ and the computation period $T_{psi2}$ for the rotor position estimate $\hat{\theta}_r$.

Generally, command values are used in place of detected values in the control of a rotating machine as values of the stator voltages. If the control computation period $T_{psi}$ is an integer multiple of the half of the switching period $T_{sw}$, the voltage command value and a smoothed value of the actual voltage will be equal for each control computation period $T_{psi}$. Note that when an actual voltage average obtained by smoothing is used, the average becomes substantially equal to the voltage command value.

Regarding the switching period $T_{sw}$ and the control computation period $T_{psi}$, FIG. 5 illustrates a case where $T_{psi}=1\times(T_{sw}/2)$, and FIG. 6 illustrates a case where $T_{psi}=3\times(T_{sw}/2)$. In each of the drawings, a top section illustrates a waveform of the u-phase voltage command value $v_{su}^*$ and a waveform of the carrier signal c, and a bottom section illustrates a waveform of the u-phase voltage $v_{su}$. The u-phase voltage command value $v_{su}^*$ takes on a sinusoidal waveform.

In both the cases of FIGS. 5 and 6, it can be verified that the u-phase voltage $v_{su}$ becomes substantially equal to the u-phase voltage command value $v_{su}^*$ when averaged over the control computation period $T_{psi}$. At the same time, it can be understood that if the control computation period $T_{psi}$ is not the integer multiple of $T_{sw}/2$, the u-phase voltage $v_{su}$, which has been smoothed over each control computation period $T_{psi}$, does not match the u-phase voltage command value $v_{su}^*$.

FIG. 7 illustrates a relationship between the three phase voltages and the u-phase current when the phase current is detected at peaks and valleys of the carrier signal c. A top section illustrates waveforms of the voltage command values $v_{su}^*$, $v_{sv}^*$, and $v_{sw}^*$ for the phases and a waveform of the carrier signal c. A middle section illustrates, from the top, a waveform of the u-phase voltage $v_{su}$, a waveform of a v-phase voltage $v_{sv}$, and a waveform of a w-phase voltage $v_{sw}$. A bottom section illustrates a waveform of the stator current $i_{su}$. FIG. 7 also illustrates the timing of current detection being synchronized with peaks and a valley of the carrier signal c. The timing of current detection may be considered equivalent to control timing.

At the peaks and valleys of the carrier signal c, values of the three phase voltages are all the same. Therefore, at the peaks and valleys of the carrier signal c, a line voltage applied between lines of the stator 2a is substantially zero. Consequently, at the peaks and valleys of the carrier signal, changes in the stator currents are small, and the three phase currents change gently, enabling the current detection with no influence of ripple currents. As described, at the peaks and valleys of the carrier signal c, the stator currents can be detected during the half of the switching period $T_{sw}$, with the influence of the ripple currents being removed.

As mentioned earlier, the switching frequency is set at the integer multiple of the fundamental frequency $f_s$. It is to be noted here that the fundamental frequency $f_s$ of the rotating machine 2 is not constant and changes from moment to moment. Therefore, a carrier frequency that is equivalent to the switching frequency needs to be changed in real time in accordance with the changing fundamental frequency $f_s$. Here in order to be the integer multiple of the half of the switching period $T_{sw}$, the control computation period $T_{psi}$ needs to be changed sequentially in real time by following typical rotating machine control. Changing the control computation period $T_{psi}$ to realize this while computing in the variable period leads to an increased load of control computation and adds complexity to control design.

Therefore, in the first embodiment, the control computation period $T_{psi}$ is a fixed value and is not sequentially adjusted to an integer multiple of the half of the switching period $T_{sw}$. In this way, the load of control computation is reduced, eliminating the need for an expensive microprocessor or another such computing device. Furthermore, the control design is made relatively simple. In this case, the voltage command value $v_s^*$ does not match a smoothed value of the actual voltage. Consequently, the voltage command values $v_s^*$ include errors with respect to the actual voltages. Furthermore, with the control computation period $T_{psi}$ not adjusted to the integer multiple of the half of the switching period $T_{sw}$, the timing of current detection is not synchronized with the peaks and valleys of the carrier signal c. Therefore, the currents detected by the current detector 4 also include errors with respect to actual currents.

As described above, when the control computation period $T_{psi}$ is not adjusted to the integer multiple of the half of the switching period $T_{sw}$, the stator voltages and the stator currents can include errors. When the stator voltages and the stator currents include the errors, an error occurs in the flux linkage $\psi_s$ computed through the use of these as well. Furthermore, since the computation of the flux linkage $\psi_s$ is fundamentally an integration operation, influence of a direct-current component and direct-current proximity components including low-frequency components is particularly significant. Errors in the direct-current proximity components of the stator voltages and currents, when transformed to the rotating frame that rotates at the fundamental frequency $f_s$ synchronously with the rotor position, become errors near the fundamental frequency $f_s$. Since the computation of the position estimate uses the flux linkage $\psi_s$ in the rotating frame, more precisely, the active flux $\psi_{afd}$ with the d-axis as the reference, an error near the fundamental frequency $f_s$ also occurs in the rotor position estimate $\hat{\theta}_r$. If the rotor position estimate $\hat{\theta}_r$ with the pulsating error is used in the control of the rotating machine 2, the torque and power pulsate. To deal with this, the position estimator 7 according to the first embodiment has the computed output of the observer 705 go through the variable frequency notch filter 706 and uses the output of the variable frequency notch filter 706 as the rotor position estimate $\hat{\theta}_r$. Therefore, the position estimator 7 is capable of estimating the position that removes the torque and power pulsations resulting from the error near the fundamental frequency $f_s$.

Next, a summary of the effects of the above-described control computation according to the first embodiment is provided. To begin with, in the first embodiment, the switching frequency is synchronized with the integer multiple of the fundamental frequency $f_s$ of the rotating machine 2. As a result, even when the switching frequency is low, the rotating machine 2 can be supplied with the stator voltage and the stator current that both have low distortion. In the first embodiment, each of the period $T_{psi1}$ for the computation of the flux linkage $\psi_s$ by the observer 705 and the period $T_{psi2}$ for the computation of the rotor position estimate $\hat{\theta}_r$ are not sequentially adjusted to the integer multiple of the half of the switching period $T_{sw}$. In this way, the load of control computation is reduced, eliminating the need for an expensive microprocessor or another such computing device. Furthermore, the control design is made relatively simple. Even with such a configuration, the error near the fundamental frequency $f_s$ and the pulsation can be reduced by the variable frequency notch filter 706 in the estimation of the rotor position. Therefore, the control device 100 can be configured to be position sensor-less and reduce torque and power pulsations without requiring the expensive microprocessor, producing a notable effect non-conventional.

As described above, the position estimator of the control device for the rotating machine according to the first embodiment estimates, on the basis of the voltage command values and the stator currents, the rotor position through the variable frequency notch filter that removes the frequency component of the fundamental frequency of the rotational speed of the rotating machine. In this way, the torque and power pulsations resulting from the estimation error, which can be included in the estimate of the rotor position, can be reduced.

The estimate of the rotor position can be computed from the phase of the estimate of the component that, among the flux linkage components, rotates synchronously with the rotor position. The flux linkage used in this computation can be obtained by integrating at least the stator voltage command. In the computation of the flux linkage by the integration, an offset component can occur and result in an error in the estimate and pulsation. However, the use of the method in the first embodiment allows for a smaller error that could be included in the estimate and reduced pulsation.

In the control device for the rotating machine according to the first embodiment, the PWM modulator synchronizes the switching frequency at which the on-off switching of the switching elements is performed with the integer multiple of the fundamental frequency of the rotational speed of the rotating machine. As a result, the rotating machine can be supplied with the stator voltage and the stator current that both have low distortion. Furthermore, in the computation of the flux linkage by the integration, an offset component can occur and result in an error in the estimate and pulsation. However, the use of this technique allows for reduction of such an offset component, a smaller error that could be included in the estimate, and reduced pulsation.

The control device for the rotating machine according to the first embodiment can enjoy its effects when the computation period for the rotor position estimation is not the integer multiple of the half of the switching period. With the computation period for the rotor position estimation not adjusted to the integer multiple of the half of the switching period, the estimate of the rotor position can include an error. However, the use of the method in the first embodiment allows for reduction of such an error.

The control device for the rotating machine according to the first embodiment can obtain its effects when the computation period for the flux linkage computation is not the integer multiple of the half of the switching period. When the computation period for the flux linkage computation is not adjusted to the integer multiple of the half of the switching period, the stator voltages and the stator currents can include errors. However, the use of the method in first embodiment allows for reduction of these errors.

Figure 8:
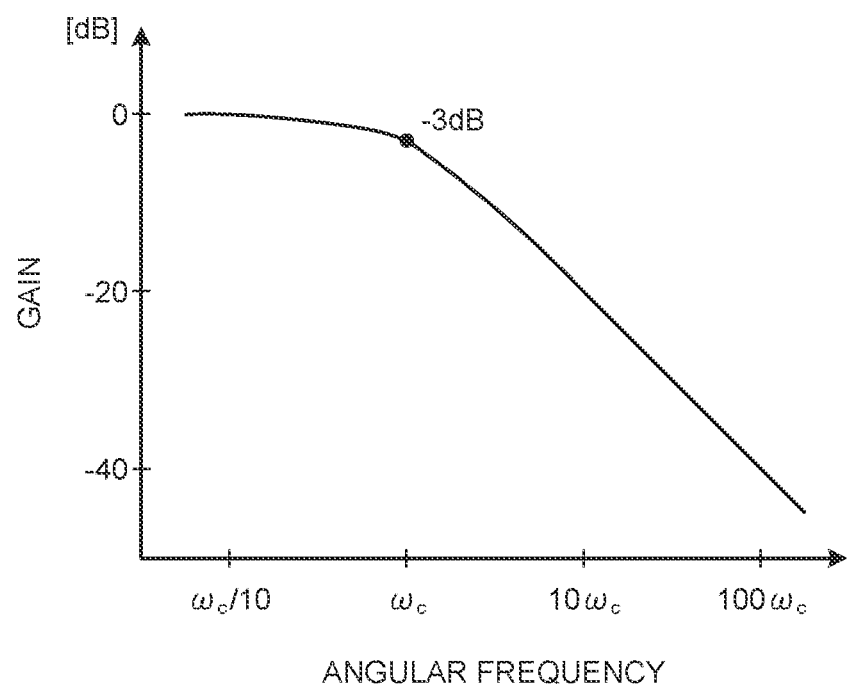
FIG. 8 is a diagram provided for explaining a response frequency in the first embodiment.

In the control device for the rotating machine according to the first embodiment, the lower limit is preferably set for the frequency component to be removed by the filter. The lower limit is preferably equal to or higher than the response frequency at which the rotor position is estimated. Below that frequency, the response frequency allows the control to follow. When a response angular frequency in a first-order lag system in which the position estimation response is general is $\omega_c$, a frequency characteristic of gain of the position estimation response is illustrated as shown in FIG. 8, for example. In FIG. 8, a vertical axis represents the gain. In FIG. 8, the gain is substantially 1 at angular frequencies lower than and equal to the response angular frequency $\omega_c$, from which it is verified that the position estimation system converges sufficiently. If the above-mentioned resonant angular frequency is set below the response frequency for the position estimation, the interference between the filter processing and the position estimation is conceivable, which results in reduced response and the occurrence of oscillation in the processing for obtaining the estimate of the rotor position. On the other hand, when the lower limit for the frequency component to be removed by the filter is set and further the lower limit is set equal to or higher than response frequency for the position estimation processing, such problems are avoidable.

Second Embodiment

Figure 9:
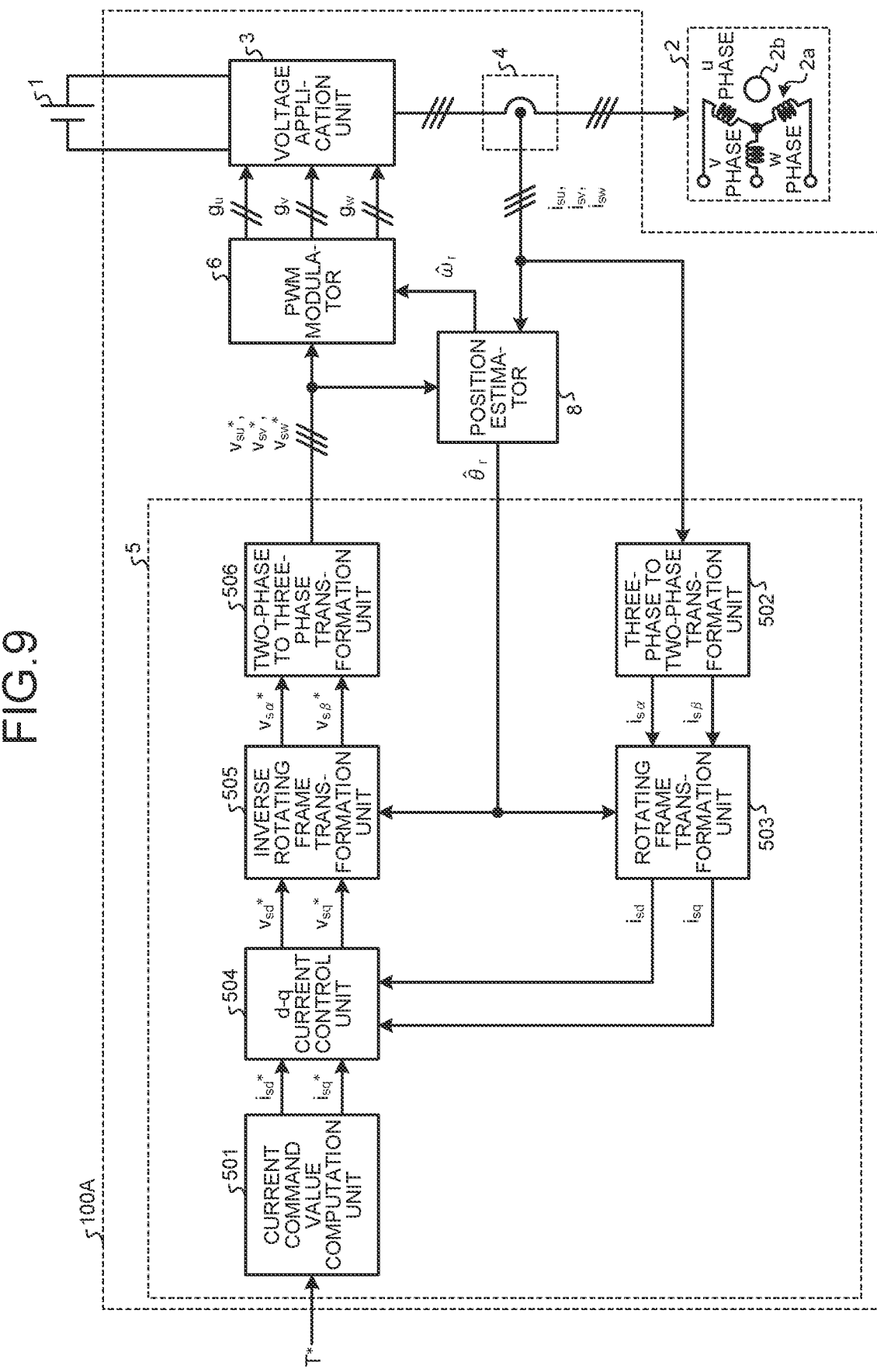
FIG. 9 is a diagram illustrating a configuration example of a control device for a rotating machine according to a second embodiment.

FIG. 9 is a diagram illustrating a configuration example of a control device 100A for a rotating machine according to a second embodiment. Compared with the control device 100 illustrated in FIG. 1, the control device 100A according to the second embodiment includes a position estimator 8 in FIG. 9 that replaces the position estimator 7. The configuration is otherwise identical or equivalent to that of the control device 100, and identical or equivalent constituent elements have the same reference characters and are not redundantly described.

Figure 10:
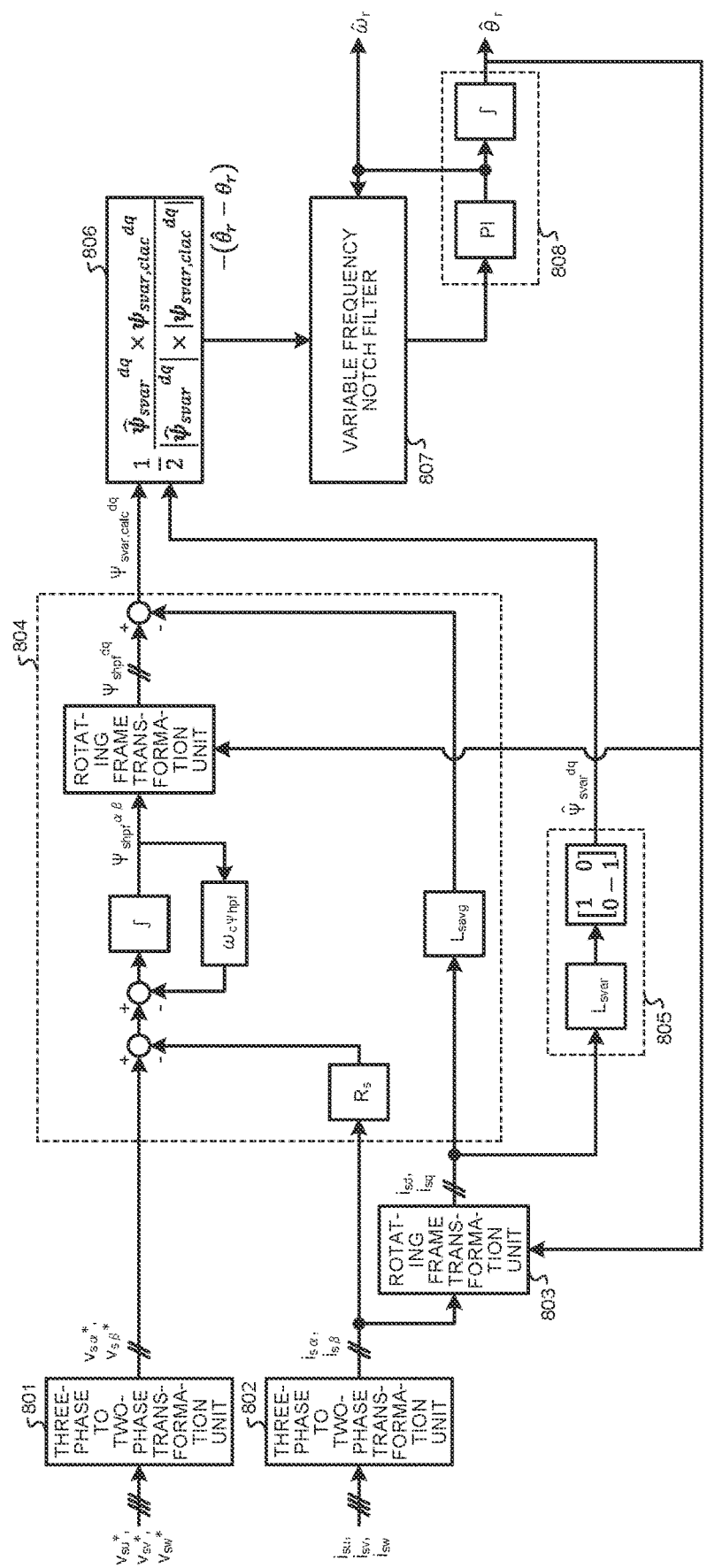
FIG. 10 is a diagram illustrating a configuration example of a position estimator illustrated in FIG. 9.

FIG. 10 is a diagram illustrating a configuration example of the position estimator 8 illustrated in FIG. 9. The position estimator 8 can be configured to include three-phase to two-phase transformation units 801 and 802, a rotating frame transformation unit 803, a first computation unit 804, a first estimator 805, a second computation unit 806, a variable frequency notch filter 807, and a third computation unit 808.

The three-phase to two-phase transformation unit 801 transforms the voltage command values $v_{su}{}^*$, $v_{sv}{}^*$, and $v_{sw}{}^*$, which are the command values for the stator voltages Vs of the phases in the three-phase frame, to voltage command values $v_{s\alpha}{}^*$ and $v_{s\beta}{}^*$ in the two-phase frame by three-phase to two-phase transformation. Similarly, the three-phase to two-phase transformation unit 802 transforms the stator currents $i_{su}$, $i_{sv}$, and $i_{sw}$ in the three-phase frame to stator currents $i_{s\alpha}$ and $i_{s\beta}$ in the two-phase frame by three-phase to two-phase transformation. Using the rotor position estimate $\hat{\theta}_r$, the rotating frame transformation unit 803 transforms the stator currents $i_{s\alpha}$ and $i_{s\beta}$ in the two-phase frame to stator currents $i_{sd}$ and $i_{sq}$ in the rotating frame by rotating frame transformation.

A description is provided next of processing details of the first computation unit 804 and the first estimator 805. The first computation unit 804 computes a flux-linkage inductance variation component. The first estimator 805 provides an estimate of the flux-linkage inductance variation component.

To begin with, the flux linkage $\psi_s{}^{\alpha\beta}$ of the rotating machine 2 in the two-phase frame is determined by Formula (25) below.

Formula 25

$$\psi_s^{\alpha\beta} = \int \left(v_s^{\alpha\beta*} - R_s i_s^{\alpha\beta}\right) dt \qquad (25)$$

An integration part of above Formula (25) is expressed by a transfer function shown by Formula (26) below.

Formula 26

$$\psi_s^{\alpha\beta} = \frac{v_s^{\alpha\beta*} - R_s i_s^{\alpha\beta}}{s} \qquad (26)$$

Generally, when flux linkage is computed by integration, an initial value is usually unknown. Therefore, a high-pass filter (HPF) with a sufficiently low cutoff frequency compared to a fundamental frequency component is used in computing flux linkages in the stationary frames, which are the three-phase frame and the two-phase frame. This method, which is a method of computing the flux linkage in the stationary frame through the use of the integration and the HPF, is called herein "incomplete integration". A transfer function of the high-pass filter used in this incomplete integration can be expressed by Formula (27) below, where $\omega_{hpf}$ is the cutoff frequency.

Formula 27

$$G_{hpf}(s) = \frac{s}{s + \omega_{hpf}} \qquad (27)$$

Applying the HPF expressed by above Formula (27) to above Formula (26) gives Formula (28) below.

Formula 28

$$\psi_{shpf}^{\alpha\beta} = \frac{v_s^{\alpha\beta*} - R_s i_s^{\alpha\beta}}{s + \omega_{hpf}} \qquad (28)$$

Above formula (28) is a formula expressing flux linkage $\psi_{shpf}{}^{\alpha\beta}$, with the HPF applied. Above Formula (28) is changed into Formula (29) below.

Formula 29

$$\psi_{shpf}^{\alpha\beta} = \frac{v_s^{\alpha\beta*} - R_s i_s^{\alpha\beta} - \omega_{hpf}\psi_{shpf}^{\alpha\beta}}{s} \qquad (29)$$

In the position sensor-less control of the synchronous reluctance motor, the method of utilizing the incomplete integration for the flux linkage computation is possible. With the method of utilizing the incomplete integration, a computational load is low compared to when an observer is used, allowing for the use of a less expensive microprocessor or another such computing device. As in the first embodiment, during high-speed rotation of the rotating machine 2, the term with a product of the winding resistance $R_s$ and the stator current $i_s^{\alpha\beta}$ in above Formula (28) is small compared to a voltage command value $v_s^{\alpha\beta*}$ and thus can be ignored. In the computation of the flux linkage $\psi_{shpf}^{\alpha\beta}$ of above Formula (29), the command value $v_s^{\alpha\beta*}$ is used as the stator voltage, and detected values are used for the stator current $i_s^{\alpha\beta}$. Furthermore, in the second embodiment, the period $T_{psi1}$ for the flux linkage computation utilizing the incomplete integration is not an integer multiple of half of the switching period $T_{sw}$, and the period $T_{psi2}$ for the subsequent computation of the rotor position estimate $\hat{\theta}_r$, too, is not an integer multiple of the half of the switching period $T_{sw}$.

The flux linkage $\psi_s^{\alpha\beta}$ of the rotating machine 2 in the two-phase frame is expressed by above Formula (6). When subjected to rotating frame transformation using the rotor position estimate $\hat{\theta}_r$, this flux linkage $\psi_s^{\alpha\beta}$ can be expressed by Formula (30) below.

Formula 30

$$\psi_s^{dq} = L_{savg} i_s^{dq} + L_{svar} \begin{bmatrix} \cos(2(\theta_r - \hat{\theta}_r)) & \sin(2(\theta_r - \hat{\theta}_r)) \\ \sin(2(\theta_r - \hat{\theta}_r)) & -\cos(2(\theta_r - \hat{\theta}_r)) \end{bmatrix} i_s^{dq} \quad (30)$$

In above Formula (30), the first term is a term including the mean inductance component $L_{savg}$, which does not vary with the rotor position, and the second term is a term including the variable inductance component $L_{svar}$, which varies at the frequency twice that of the rotor position.

The first computation unit 804 determines the component corresponding to the second term of above Formula (30) by computation. Specifically, the computation is performed according to Formula (31) below that is obtained by changing above Formula (30).

Formula 31

$$\psi_{svar,calc}^{dq} = \psi_{shpf}^{dq} - L_{savg} i_s^{dq} \quad (31)$$

The first term in the right side of above Formula (31) is determined by subjecting the flux linkage $\psi_{shpf}^{\alpha\beta}$ expressed by above Formula (29) to rotating frame transformation. The second term in the right side of above Formula (31) shows the first term of above Formula (30). A configuration example of the first computation unit 804 is illustrated in FIG. 10 but is not limiting.

The first estimator 805, on the other hand, directly estimates the component corresponding to the second term of above Formula (30). A configuration example of the first estimator 805 is illustrated in FIG. 10. A description is provided for a reason why the first estimator 805 can be configured in such a simple manner.

To begin with, suppose that the second term of above Formula (30) is the estimate of the flux-linkage inductance variation component in the rotating frame. This estimate can be expressed as $\hat{\psi}_{svar}^{dq}$ by Formula (32) below.

Formula 32

$$\hat{\psi}_{svar}^{dq} = L_{svar} \begin{bmatrix} \cos(2(\theta_r - \hat{\theta}_r)) & \sin(2(\theta_r - \hat{\theta}_r)) \\ \sin(2(\theta_r - \hat{\theta}_r)) & -\cos(2(\theta_r - \hat{\theta}_r)) \end{bmatrix} i_s^{dq} \quad (32)$$

When the estimate $\hat{\theta}_r$ of the rotor position is approximated to be about equal to the true value $\theta_r$ of the rotor position in above Formula (32), above Formula (32) is simplified into Formula (33) below. A configuration of a controller representing this Formula (33) is illustrated in FIG. 10.

Formula 33

$$\hat{\psi}_{svar}^{dq} = L_{svar} \begin{bmatrix} 1 & 0 \\ 0 & -1 \end{bmatrix} i_s^{dq} \quad (33)$$

A description is provided next of processing details of the second computation unit 806, the variable frequency notch filter 807, and the third computation unit 808.

To begin with, a cross product of the estimate $\hat{\psi}_{svar}^{dq}$ of the flux-linkage inductance variation component and the computed value $\psi_{svar,calc}^{dq}$ is expressed by Formula (34) below.

Formula 34

$$\hat{\psi}_{svar}^{dq} \times \psi_{svar,calc}^{dq} = |\hat{\psi}_{svar}^{dq}||\psi_{svar,calc}^{dq}|\sin(2(\theta_r - \hat{\theta}_r)) \quad (34)$$

When the estimate $\hat{\theta}_r$ of the rotor position is approximated to be about equal to the true value $\theta_r$ of the rotor position in above Formula (34), that is to say, $\hat{\theta}_r \approx \theta_r$, a rotor position estimation error "$-(\hat{\theta}_r - \theta_r)$" can be computed by Formula (35) below.

Formula 35

$$-(\hat{\theta}_r - \theta_r) = \frac{1}{2} \frac{\hat{\psi}_{svar}^{dq} \times \psi_{svar,calc}^{dq}}{|\hat{\psi}_{svar}^{dq}||\psi_{svar,calc}^{dq}|} \quad (35)$$

In the above-described manner, the second computation unit 806 computes the rotor position estimation error "$-(\hat{\theta}_r - \theta_r)$" on the basis of the computed value obtained by above Formula (31) and the estimate obtained by above Formula (33).

The rotor position estimation error "$-(\hat{\theta}_r - \theta_r)$" computed by the second computation unit 806 is input to the variable frequency notch filter 807 to undergo filter processing and is then input to the third computation unit 808. The third computation unit 808 computes the rotor position estimate $\hat{\theta}_r$ by performing, in converging the rotor position estimation error "$-(\hat{\theta}_r - \theta_r)$" to zero, proportional-integral (PI) control on the rotor position estimation error "$-(\hat{\theta}_r - \theta_r)$" and integration thereafter. Furthermore, the third computation unit 808 computes the rotational angular speed estimate $\hat{\omega}_r$ in its process of converging the rotor position estimation error "$-(\hat{\theta}_r - \theta_r)$" to zero. The variable frequency notch filter 807 to be used can be identical or equivalent to the variable frequency notch filter 706 described in the first embodiment.

According to the second embodiment described above, the control device for the rotating machine enables the rotor position estimation method using the variable frequency notch filter, which removes the frequency component of the fundamental frequency of the rotational speed of the rotating machine, to be applied to the configuration for the computation of the flux linkage in the stationary frame. Since the flux linkage is computed in the stationary frame by the integration in the position sensor-less control of the synchronous reluctance motor as the rotating machine, an offset component occurs, easily resulting in an error in the estimate and pulsation. Therefore, the method in the second embodiment can be suitably used in the position sensor-less control of the synchronous reluctance motor.

Next, a summary of the effects of the above-described control computation according to the second embodiment is provided. To begin with, in the second embodiment, the period $T_{psi1}$ for the computation of the flux linkage $\psi_s$ that uses above Formula (29) utilizing the incomplete integration and the period $T_{psi2}$ for the computation of the rotor position estimate $\hat{\theta}_r$ are both not the integer multiple of the half of the switching period $T_{sw}$. In this case, the voltage command value $v_s^*$ does not match a smoothed value of the actual voltage. Consequently, the voltage command values $v_s^*$ include errors with respect to the actual voltages. Furthermore, since the timing of current detection is not synchronized with the peaks and valleys of the carrier signal c, the detected currents include errors with respect to the actual currents. Therefore, an error also occurs in the flux linkage $\psi_s$ computed through the use of these. In the second embodiment, the computation of the flux linkage $\psi_s$ does not use an observer that converges the flux linkage $\psi_s$ to a true value, but the incomplete integration. Therefore, the error in the flux linkage $\psi_s$ is greater, and the convergence to the true value is relatively slow. Furthermore, since the flux linkage computation is based on the integration operation, the error becomes greater in a range from a direct-current component to a low-frequency component. As a result, an error near the fundamental frequency $f_s$ becomes greater in the rotating frame, and a greater error occurs near the fundamental frequency $f_s$ in the rotor position estimate $\hat{\theta}_r$ as well. To deal with this problem, the position estimator 8 according to the second embodiment has the output of the second computation unit 806 undergo the reduction at the variable frequency notch filter 807 before being input to the third computation unit 808. Therefore, in the rotor position estimation, the position estimator 8 can reduce the error near the fundamental frequency and pulsation. The position estimator 8 according to the second embodiment does not use the observer, but the incomplete integration for computing the flux linkage, thus allowing reduction of the computational load compared with that of the first embodiment. Therefore, through the use of the method in the second embodiment, the control device 100A can be configured to be position sensor-less and reduce torque and power pulsations without requiring an expensive microprocessor, which produces a notable effect non-conventional.

Third Embodiment

Figure 11:
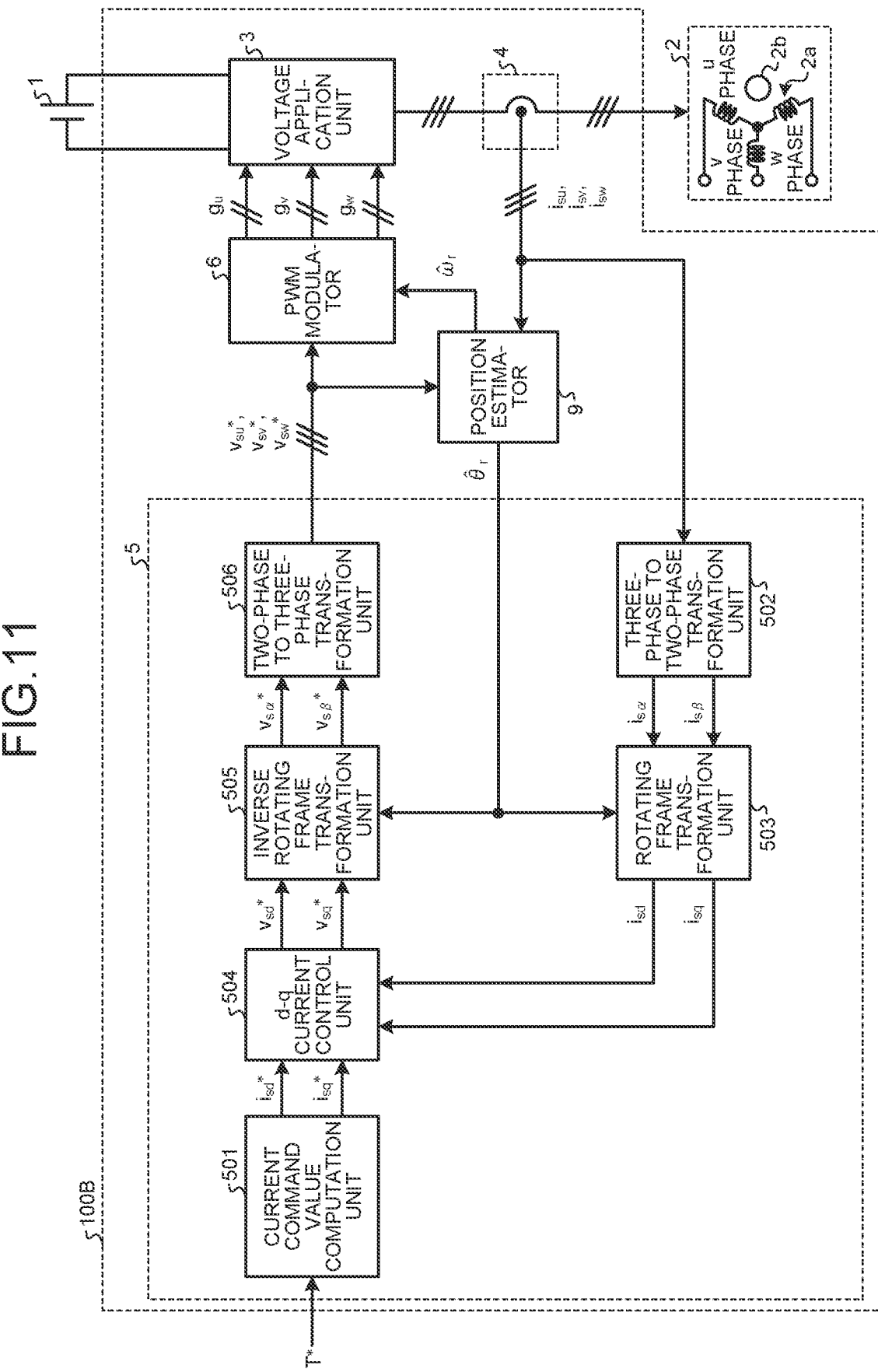
FIG. 11 is a diagram illustrating a configuration example of a control device for a rotating machine according to a third embodiment.

FIG. 11 is a diagram illustrating a configuration example of a control device 100B for a rotating machine according to a third embodiment. Compared with the control device 100 illustrated in FIG. 1, the control device 100B according to the third embodiment includes a position estimator 9 in FIG. 11 that replaces the position estimator 7. The configuration is otherwise identical or equivalent to that of the control device 100, and identical or equivalent constituent elements have the same reference characters and are not redundantly described.

In the third embodiment, flux linkage computation is performed without using integration in estimating the rotor position and the rotational speed. Here a description is provided first of a principle of the estimation of the rotor position and the rotational speed by the position estimator 9. To begin with, a rotating machine model having the characteristics of the rotating machine 2 expressed mathematically is expressed in the rotating frame by Formulas (36) and (37) below.

Formula 36

$$v_s^{dq} = R_s i_s^{dq} + \frac{d}{dt}\psi_s^{dq} + \omega_r J \psi_s^{dq} \quad (36)$$

Formula 37

$$\psi_s^{dq} = \begin{bmatrix} L_d & 0 \\ 0 & L_q \end{bmatrix} i_s^{dq} \quad (37)$$

Symbol J in above Formula (36) is the transformation matrix expressed by above Formula (15).

In the third embodiment, an inductance value is computed. Therefore, above Formula (37) is expressed as Formula (38) below.

Formula 38

$$\psi_{s,calc}^{dq} = \begin{bmatrix} L_{sd,calc} & 0 \\ 0 & L_{sq,calc} \end{bmatrix} i_s^{dq} \quad (38)$$

In above Formula (38), $L_{sd,calc}$ represents computed d-axis inductance, and $L_{sq,calc}$ represents computed q-axis inductance.

Since induced voltage $\omega_r J \psi_s^{dq}$ in the third term in the right side of above Formula (36) is also computed, this induced voltage $\omega_r J \psi_s^{dq}$ is represented by $v_{emf,calc}$. When the derivative term of above Formula (36), that is to say, the second term in the right side of above Formula (36) is ignored here, the induced voltage $v_{emf,calc}$ can be computed as the computed value by using Formula (39) below that uses the stator voltage $v_s^{dq}$ and the stator current $i_s^{dq}$.

Formula 39

$$v_{emf,calc} = v_s^{dq} - R_s i_s^{dq} \quad (39)$$

The voltage command value $v_s^{dq*}$ is used as the stator voltage $v_s^{dq}$, and detected values are used for the stator current $i_s^{dq}$.

An induced voltage estimate $\hat{v}_{emf}$ that is an estimate of induced voltage $v_{emf}$ can be obtained by using Formula (40) below that uses flux linkage $\psi_{s,calc}^{dq}$ computed by above Formula (38) and the rotational speed estimate $\hat{\omega}_r$.

Formula 40

$$\hat{v}_{emf} = \hat{\omega}_r J \psi_{s,calc}^{dq} \quad (40)$$

The rotational speed estimate $\hat{\omega}_r$, which is the estimate of the rotational speed $\omega_r$, can be obtained by comparing the computed value obtained by Formula (39) above and the estimate obtained by above Formula (40) and performing proportional-integral control to converge a difference to zero.

Dividing the induced voltage $v_{emf,calc}$ computed by above Formula (39) by the rotational speed estimate $\hat{\omega}_r$ gives a computed value of the flux linkage $\psi_s$, and further dividing this computed value by the stator current $i_s$ gives the computed inductance value.

As shown in above Formula (6), the inductance value varies depending on the true rotor position $\theta_r$. Furthermore, as shown in above Formula (30), the inductance value varies depending on a difference between the true rotor position $\theta_r$ and the rotor position estimate $\hat{\theta}_r$. Therefore, the rotor position can be estimated by checking the computed inductance value against these inductance variation characteristics. Specifically, the inductance value is computed by dividing the flux linkage $\psi_s^{dq}$, which includes the flux-linkage inductance variation component generated by the product of the variable inductance component $L_{svar}$ and the stator current $i_s$, by the stator current $i_s^{dq}$. The rotor position estimate $\hat{\theta}_r$ can be obtained from a rotor position-dependent inductance variation characteristic of the inductance value.

Figure 12:
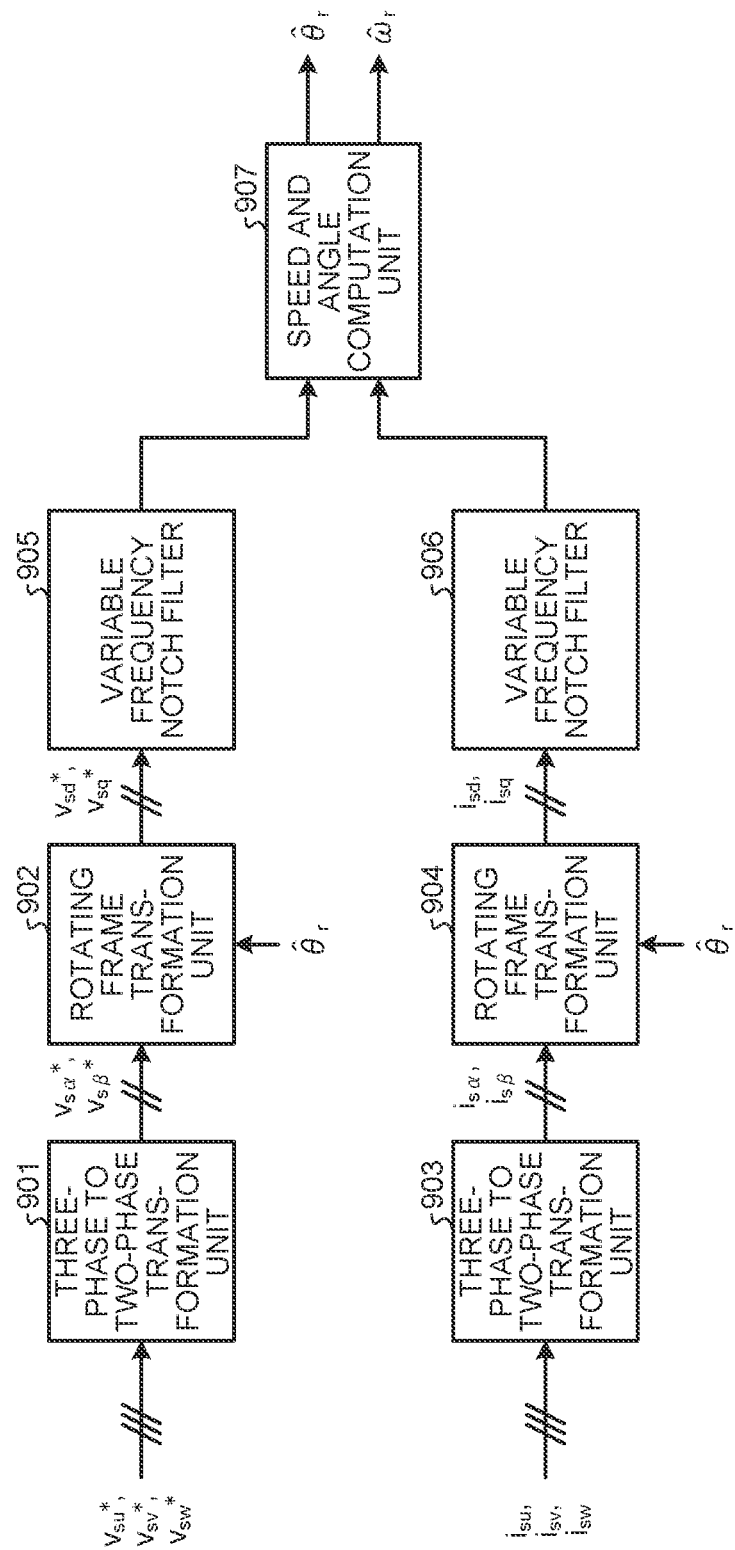
FIG. 12 is a diagram illustrating a configuration example of a position estimator illustrated in FIG. 11.

FIG. 12 is a diagram illustrating a configuration example of the position estimator 9 illustrated in FIG. 11. The position estimator 9 can be configured to include three-phase to two-phase transformation units 901 and 903, rotating frame transformation units 902 and 904, variable frequency notch filters 905 and 906, and a speed and angle computation unit 907.

The three-phase to two-phase transformation unit 901 transforms the voltage command values $v_{su}^*$, $v_{sv}^*$, and $v_{sw}^*$, which are the command values for the stator voltages $v_s$ of the phases in the three-phase frame, to voltage command values $v_{s\alpha}^*$ and $v_{s\beta}^*$ in the two-phase frame by three-phase to two-phase transformation. The three-phase to two-phase transformation unit 903 transforms the stator currents $i_{su}$, $i_{sv}$, and $i_{sw}$ in the three-phase frame to stator currents $i_{s\alpha}$ and $i_{s\beta}$ in the two-phase frame by three-phase to two-phase transformation. Using the rotor position estimate $\hat{\theta}_r$, the rotating frame transformation unit 902 transforms the voltage command values $v_{s\alpha}^*$ and $v_{s\beta}^*$ in the two-phase frame to voltage command values $v_{sd}^*$ and $v_{sq}^*$ in the rotating frame by rotating frame transformation. Using the rotor position estimate $\hat{\theta}_r$, the rotating frame transformation unit 904 transforms the stator currents $i_{s\alpha}$ and $i_{s\beta}$ in the two-phase frame to stator currents $i_{sd}$ and $i_{sq}$ in the rotating frame by rotating frame transformation. The rotor position estimate $\hat{\theta}_r$ used is one of the outputs from the speed and angle computation unit 907 that is provided as feedback.

The output of the rotating frame transformation unit 902 goes through the variable frequency notch filter 905 before being input to the speed and angle computation unit 907.

Similarly, the output of the rotating frame transformation unit 904 goes through the variable frequency notch filter 906 before being input to the speed and angle computation unit 907. The speed and angle computation unit 907 computes the rotor position estimate $\hat{\theta}_r$ and the rotational speed estimate $\hat{\omega}_r$ according to what has been described earlier.

Since the method in the third embodiment does not use an observer or incomplete integration for the flux linkage computation, a computation period may be long compared to when the observer or the incomplete integration is used. For this reason, a computational load is lower, allowing for the use of a less expensive microprocessor or another such computing device. In the third embodiment, a computation period $T_{psi3}$ for the computation of the rotor position estimate $\hat{\theta}_r$ and the rotational speed estimate $\hat{\omega}_r$ is not an integer multiple of half of the switching period $T_{sw}$ as in the first and second embodiments. In this case, the voltage command value $v_s^*$ does not match a smoothed value of the actual voltage. Consequently, the voltage command values $v_s^*$ include errors with respect to the actual voltages. Furthermore, since the timing of current detection is not synchronized with the peaks and valleys of the carrier signal, the currents detected by the current detector 4 also include errors with respect to the actual currents. Therefore, errors also occur in the rotor position estimate $\hat{\theta}_r$ and the rotational speed estimate $\hat{\omega}_r$ that are computed through the use of these.

In the rotating machine 2, lower-frequency errors generate greater oscillation components in flux and torque. A direct-current component and low-frequency direct-current proximity components in the stationary frame translate into errors near the fundamental frequency $f_s$ in the rotating frame. To deal with this, the position estimator 9 according to the third embodiment has the outputs of the rotating frame transformation units 902 and 904 go respectively through the variable frequency notch filters 905 and 906 before being input to the speed and angle computation unit 907. Therefore, the position estimator 9 is capable of the position estimation that removes torque and power pulsations resulting from the error near the fundamental frequency $f_s$.

As described above, the position estimator 9 according to the third embodiment computes the flux linkage without using the observer and the incomplete integration, thus allowing for the low computational load compared with those of the first and second embodiments. Therefore, through the use of the method in the third embodiment, the control device 100B can be configured to be position sensorless and reduce torque and power pulsations without requiring an expensive microprocessor, producing a notable effect non-conventional.

Figure 13:
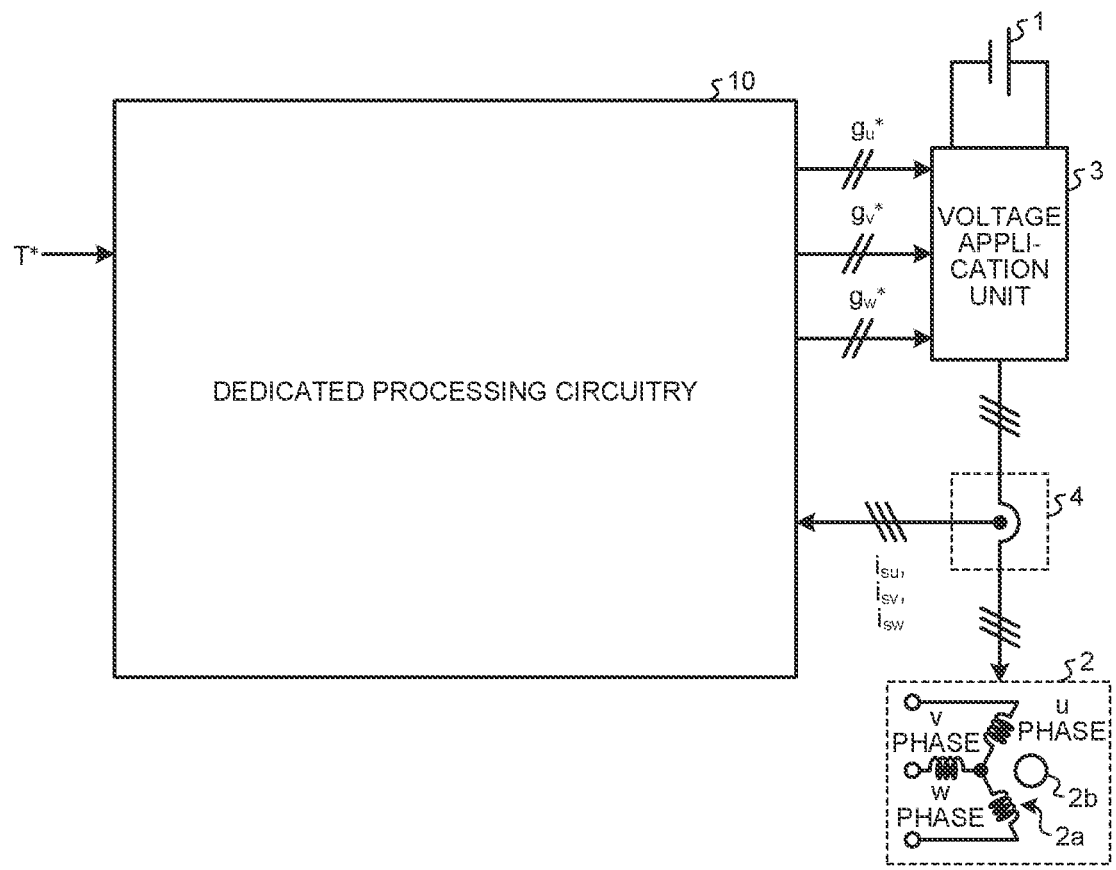
FIG. 13 is a diagram illustrating a first hardware configuration that implements functions of each of the control devices according to the first through third embodiments.
Figure 14:
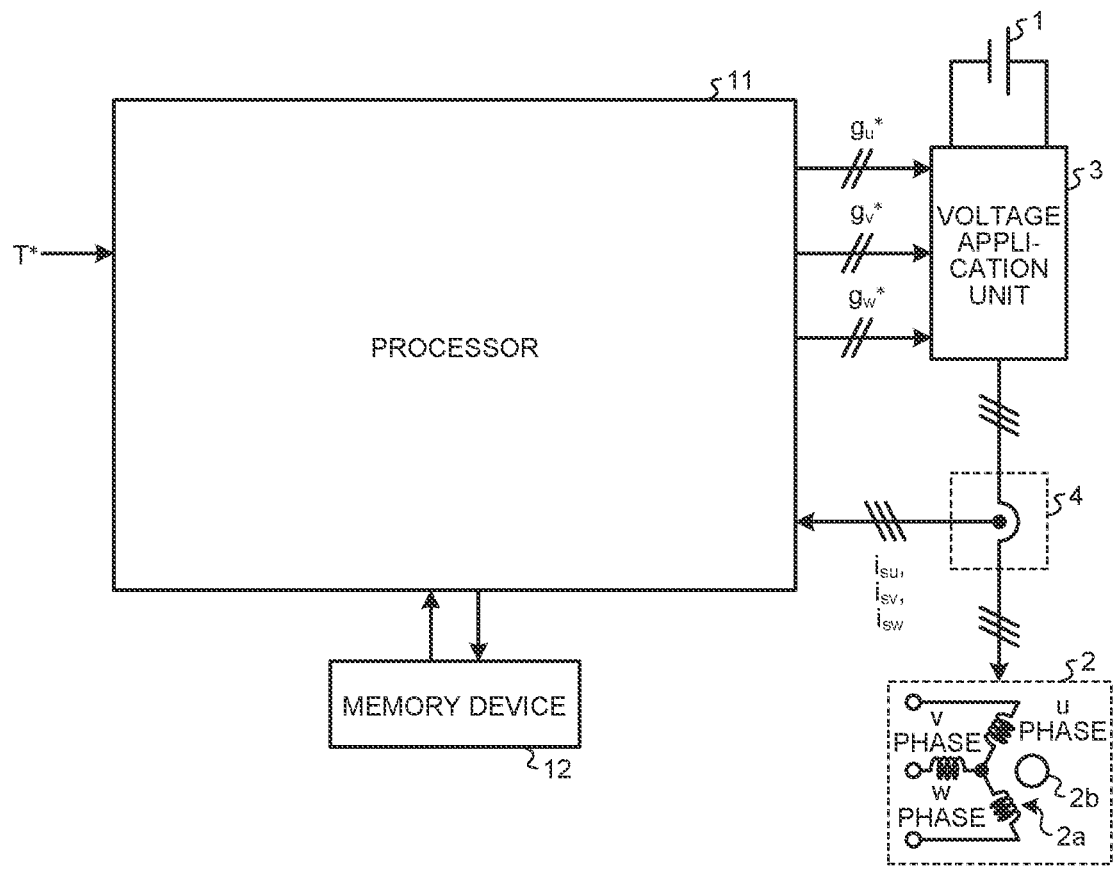
FIG. 14 is a diagram illustrating a second hardware configuration that implements the functions of each of the control devices according to the first through third embodiments.

With reference to FIGS. 13 and 14, a description is provided next of hardware configurations for the above-described control devices 100, 100A, and 100B according to the first through third embodiments. FIG. 13 is a diagram illustrating a first hardware configuration that implements the functions of each of the control devices 100, 100A, and 100B according to the first through third embodiments. FIG. 14 is a diagram illustrating a second hardware configuration that implements the functions of each of the control devices 100, 100A, and 100B according to the first through third embodiments. The functions of each of the control devices 100, 100A, and 100B refer to the functions of the control unit 5, the PWM modulator 6, and the position estimator 7, 8, or 9 that are included in the control device 100, 100A, or 100B.

The functions of the control unit 5, the PWM modulator 6, and the position estimator 7, 8, or 9 can be implemented with processing circuitry. In FIG. 13, the control unit 5, the PWM modulator 6, and the position estimator 7, 8, or 9 of each of the first through third embodiments have been replaced by dedicated processing circuitry 10. Corresponding to the dedicated processing circuitry 10 used as dedicated hardware is a single circuit, a composite circuit, an application-specific integrated circuit (ASIC), a field-programmable gate array (FPGA), or a combination of these. The functions of the control unit 5, the PWM modulator 6, and the position estimator 7, 8, or 9 may be implemented individually or collectively with the processing circuitry.

In FIG. 14, the control unit 5, the PWM modulator 6, and the position estimator 7, 8, or 9 in the configuration according to each of the first through third embodiments have been replaced by a processor 11 and a memory device 12. The processor 11 may be an arithmetic means such as an arithmetic unit, a microprocessor, a microcomputer, a central processing unit (CPU), or a digital signal processor (DSP). The memory device 12 can be, for example, a nonvolatile or volatile semiconductor memory such as a random-access memory (RAM), a read-only memory (ROM), a flash memory, an erasable programmable ROM (EPROM), or an electrically EPROM (EEPROM) (registered trademark).

When the processor 11 and the memory device 12 are used, the functions of the control unit 5, the PWM modulator 6, and the position estimator 7, 8, or 9 are implemented with software, firmware, or a combination of these. The software or the firmware is described as programs and is stored in the memory device 12. The processor 11 reads and executes the programs stored in the memory device 12. These programs can be said to cause a computer to execute procedures and methods for the functions of the control unit 5, the PWM modulator 6, and the position estimator 7, 8, or 9. Usable examples of the memory device 12 include the nonvolatile and volatile semiconductor memories such as the ROM, the EPROM, and the EEPROM, a flexible disk, an optical disk, a compact disk, and a DVD, among others. The memory device 12 can store the above-mentioned two coefficients $k_1$ and $k_2$ for each of those frequencies that the variable frequency notch filters 706, 807, 905, and 906 remove.

The functions of the control unit 5, the PWM modulator 6, and the position estimator 7, 8, or 9 may be implemented partly with hardware and partly with software or firmware. For example, the function of the PWM modulator 6 may be implemented with dedicated hardware, with the functions of the control unit 5 and the position estimator 7, 8, or 9 implemented with the processor 11 and the memory device 12.

While the synchronous reluctance motor is the example of the rotating machine 2 in the second and third embodiments described herein, the rotating machine 2 may be an induction motor or a permanent magnet motor. When the rotating machine 2 is the induction motor, a method disclosed in Japanese Patent Application Laid-open No. H11-4599, for example, can be used. When the rotating machine 2 is the permanent magnet motor, a method disclosed in PCT International Publication No. 2002/091558, for example, can be used. Part of the method in the third embodiment uses a method described in Japanese Patent Application Laid-open No. 2002-165475. Therefore, for details not described in the third embodiment, refer to contents of this publication.

While the voltage application unit 3 used and described herein is the three-phase 2-level inverter, this is not limiting. The voltage application unit 3 may be an inverter with a different number of phases. The voltage application unit 3 may be a multi-level inverter such as a 3-level inverter or a 5-level inverter. These inverters can even be used in implementing control devices for rotating machines according to the present disclosure.

The switching frequency described herein as the example is 1 to 27 times the fundamental frequency $f_s$. Generally, when, for example, a common carrier signal is used for the three phases, the switching frequency to be used is one times as high as the fundamental frequency $f_s$ or 3, 6, 9, . . . , or 27 times as high as the fundamental frequency $f_s$, where these numbers are multiples of 3. On the other hand, when a fixed switching pattern is used without utilizing a carrier signal, any multiple is usable as long as the multiple is an integer multiple.

While the stator currents described herein are set for the torque of the rotating machine 2 to minimize the root-mean-square current value, this is not limiting. The stator currents for the torque of the rotating machine 2 may be set to minimize the flux linkage or maximize efficiency of the voltage application unit 3 or the rotating machine 2.

In the example shown in each of the first and second embodiments described herein, the variable frequency notch filter 706 or 807 is inserted in series with the part that performs the rotor position estimation processing. In the example shown in the third embodiment, the variable frequency notch filters 905 and 906 are inserted respectively in series with the parts that output the stator voltages and the stator currents. These are just the examples. The insertion can be at an appropriately selected position based on where the error to be removed occurs. Furthermore, the single variable frequency notch filter for each position does not have to be the case; plural variable frequency notch filters may be inserted for each position.

While the voltage command values are used herein as the stator voltages to be used in the control computation, detected stator voltages may be used instead.

The above configurations illustrated in the embodiments are illustrative, can be combined with other techniques that are publicly known, and can be partly omitted or changed without departing from the gist. The embodiments can be combined with each other.

REFERENCE SIGNS LIST 1 direct-current power supply; 2 rotating machine; 2a stator; 2b rotor; 3 voltage application unit; 4 current detector; 5 control unit; 6 PWM modulator; 7, 8, 9 position estimator; 10 dedicated processing circuitry; 11 processor; 12 memory device; 31 to 36 switching element; 100, 100A, 100B control device; 501 current command value computation unit; 502, 701, 703, 801, 802, 901, 903 three-phase to two-phase transformation unit; 503, 702, 704, 803, 902, 904 rotating frame transformation unit; 504 d-q current control unit; 505 inverse rotating frame transformation unit; 506 two-phase to three-phase transformation unit; 705 observer; 706, 807, 905, 906 variable frequency notch filter; 804 first computation unit; 805 first estimator; 806 second computation unit; 808 third computation unit; 907 speed and angle computation unit.

The invention claimed is:

1. A control device for a rotating machine, the control device comprising:
    a voltage applicator connected between a direct-current power supply and a rotating machine to apply a rectangular stator voltage to the rotating machine through on-off switching of a plurality of switching elements included for each of phases;
    a current detector to detect a stator current flowing between the voltage applicator and a stator winding of the rotating machine;
    processing circuitry
    to compute a voltage command value on a basis of the stator current and a rotor position serving as position information of a rotor of the rotating machine, the voltage command value being a command value for a stator voltage to be applied to the stator winding;
    to perform on-off control of the switching elements so that a smoothed value of the stator voltage matches the voltage command value; and
    to estimate, on a basis of the voltage command value and the stator current, the rotor position through a filter that removes a frequency component of a fundamental frequency of rotational speed of the rotating machine.

2. The control device for a rotating machine according to claim 1, wherein
    the processing circuitry synchronizes a switching frequency, with which the on-off switching of the switching elements is performed, with an integer multiple of a fundamental frequency of rotational speed of the rotating machine.

3. The control device for a rotating machine according to claim 1, wherein an estimate of the rotor position is computed on a basis of a flux linkage of the rotating machine, and the flux linkage is obtained by integrating at least the voltage command value.

4. The control device for a rotating machine according to claim 1, wherein an estimate of the rotor position is computed on a basis of a flux linkage of the rotating machine, and the flux linkage is obtained by integrating at least the voltage command value in a stationary frame.

5. The control device for a rotating machine according to claim 3, wherein a computation period for computation of the flux linkage is not an integer multiple of half of a switching period, the switching period being a reciprocal of a switching frequency with which the on-off switching of the switching elements is performed.

6. The control device for a rotating machine according to claim 1, wherein a computation period for estimation of the rotor position is not an integer multiple of half of a switching period, the switching period being a reciprocal of a switching frequency with which the on-off switching of the switching elements is performed.

7. The control device for a rotating machine according to claim 1, wherein a lower limit is set for a frequency component to be removed by the filter.

8. The control device for a rotating machine according to claim 7, wherein the lower limit is equal to or higher than a response frequency at which the rotor position estimation is performed.

9. The control device for a rotating machine according to claim 1, wherein the processing circuitry includes a memory device that stores a filter coefficient for implementing the filter, for each of frequencies to be removed by the filter.

10. The control device for a rotating machine according to claim 1, wherein the rotating machine has a variable inductance component with which inductance varies depending on a rotor position, and the processing circuitry estimates the rotor position on a basis of a flux-linkage inductance variation component generated by a product of the variable inductance component and the stator current.

11. The control device for a rotating machine according to claim 10, wherein inductance of the rotating machine includes a mean component that does not vary depending on the rotor position and a variable component that varies at a frequency twice an electrical angular frequency of the rotor position, and the flux-linkage inductance variation component is generated by a product of the variable component and the stator current.

12. The control device for a rotating machine according to claim 4, wherein a computation period for computation of the flux linkage is not an integer multiple of half of a switching period, the switching period being a reciprocal of a switching frequency with which the on-off switching of the switching elements is performed.

\* \* \* \* \*